US012522116B2

(12) United States Patent
Messner et al.

(10) Patent No.: US 12,522,116 B2
(45) Date of Patent: Jan. 13, 2026

(54) INFANT CAR SEAT BASE ATTACHMENT MECHANISM

(71) Applicant: Britax Child Safety, Inc., Fort Mill, SC (US)

(72) Inventors: Mark Matthew Messner, Lancaster, PA (US); Mitchell L. Shellenberger, Mount Joy, PA (US); Quentin G. Walsh, Fort Mill, SC (US); Brandon Hoover, Cornelius, NC (US)

(73) Assignee: Britax Child Safety, Inc., Fort Mill, SC (US)

( * ) Notice: Subject to any disclaimer, the term of this patent is extended or adjusted under 35 U.S.C. 154(b) by 346 days.

(21) Appl. No.: 18/185,664

(22) Filed: Mar. 17, 2023

(65) Prior Publication Data

US 2023/0311721 A1 Oct. 5, 2023

Related U.S. Application Data

(60) Provisional application No. 63/326,036, filed on Mar. 31, 2022.

(51) Int. Cl.
*B60N 2/28* (2006.01)

(52) U.S. Cl.
CPC ......... *B60N 2/2821* (2013.01); *B60N 2/2845* (2013.01); *B60N 2/2824* (2013.01); *B60N 2/2827* (2013.01)

(58) Field of Classification Search
CPC .. B60N 2/2821; B60N 2/2824; B60N 2/2827; B60N 2/2845
See application file for complete search history.

(56) References Cited

U.S. PATENT DOCUMENTS

| | | | |
|---|---|---|---|
| 8,393,679 B2 | 3/2013 | Longenecker | |
| 8,714,639 B2 | 5/2014 | Heisey | |
| 8,876,208 B2 | 11/2014 | Heisey | |
| 8,915,547 B2 | 12/2014 | Longenecker | |
| 9,085,250 B2 * | 7/2015 | Cheng | B60N 2/2872 |
| 9,168,849 B2 * | 10/2015 | Chen | B60N 2/286 |
| 9,597,986 B2 * | 3/2017 | Hou | B60N 2/43 |
| 9,676,303 B2 * | 6/2017 | Hou | B60N 2/2845 |
| 10,336,219 B2 | 7/2019 | Mason | |
| 10,351,027 B2 | 7/2019 | Longenecker | |
| 10,406,947 B2 * | 9/2019 | Anderson | B60N 2/286 |
| 2014/0361589 A1 * | 12/2014 | Hou | B60N 2/2887 |
| | | | 297/256.16 |
| 2021/0078462 A1 * | 3/2021 | Cheng | B62B 7/142 |
| 2023/0045293 A1 | 2/2023 | Mchugh | |
| 2024/0001817 A1 * | 1/2024 | Zhang | B60N 2/2887 |

(Continued)

*Primary Examiner* — Syed A Islam
(74) *Attorney, Agent, or Firm* — K&L Gates LLP

(57) ABSTRACT

An infant car seat system includes a base including a first pair of brackets and a second pair of brackets; and an infant car seat including a first pair of locking pins positioned and arranged to be locked via the first pair of brackets and a second pair of locking pins positioned and arranged to be locked via the second pair of brackets, the infant car seat further including a release handle configured to allow the user to unlock the first pair of locking pins from the first pair of brackets, after which the user is able to at least partially lift the infant car seat from the base, the at least partial lifting causing the second pair of locking pins to become unlocked from the second pair of brackets.

18 Claims, 21 Drawing Sheets

(56) References Cited

U.S. PATENT DOCUMENTS

| | | |
|---|---|---|
| 2024/0116410 A1 | 4/2024 | Oltman |
| 2024/0116411 A1 | 4/2024 | Erel Caglar |
| 2024/0116412 A1 | 4/2024 | Oltman |
| 2024/0166098 A1 | 5/2024 | Larrison |
| 2024/0166101 A1 | 5/2024 | Mchugh |
| 2024/0286534 A1 | 8/2024 | Heisey |

* cited by examiner

INFANT CAR SEAT BASE ATTACHMENT MECHANISM

PRIORITY CLAIM AND CROSS-REFERENCE TO RELATED APPLICATIONS

The present application claims priority and benefit of U.S. Provisional Patent App. No. 63/326,036 filed Mar. 31, 2022, titled INFANT CAR SEAT BASE ATTACHMENT MECHANISM, the entire contents of which are incorporated by reference herein and relied upon.

BACKGROUND

The present disclosure relates generally to infant's and children's car seats.

An infant car seat is a seat made specifically for infants and younger babies. The seats typically face the rear of the car and are used from day one until the baby reaches the seat's maximum height or weight limit (typically between 22 to 35 pounds depending on the specifics of the infant car seat.

The infant car seat is one of the most important items of baby gear. If a parent plans on taking their baby for a ride in the car, an infant car seat is a must have. While infant car seat laws differ from state to state, most states require infants younger than one to be restrained in a rear-facing infant car seat. Moreover, most hospitals will not discharge the baby without a car seat.

Infant car seats are designed to attach to a base. The base remains installed in the car, held in place by the automobile's rear seat straps and buckles. It is desirable to have a number of points of attachment between the car seat and the base. In this way, if one attachment mechanism between the infant car seat and the base fails, or is improperly latched, the car seat nevertheless remains securely attached to the base.

Certain infant car seats are able to be removed from the base and inserted into a stroller. In this way, the infant does not need to be removed from the car seat and be placed in a separate seat associated with the stroller and vice versa, e.g., if the baby is sleeping. The need for multiple point attachment of the car seat to the base and the need for the car seat to be able to be attached to both the base and a stroller creates a relatively complex attachment and removal situation.

Many commercial infant car seat systems are cumbersome regarding insertion and removal of the car seat from the base and a stroller. Therefore, an improved infant car seat system is needed.

SUMMARY

The present disclosure sets forth an improved infant car seat system including an infant car seat and a base therefore. The car seat includes a release handle. The release handle is formed with or connects to a bridge member, which splits to both sides of the car seat. In this manner, a single actuation of the release handle unlocks locking mechanisms on both sides of the car seat and base. A first member extends from each end of the bridge member to a release mechanism, such that a first member and a release mechanism reside on both sides of the car seat. In a variety of embodiments, the first member is formed with the release mechanism.

Any rigid part or flexible of the car seat and the base of the car seat system of the present disclosure may be made (e.g., molded) of any one or more plastic such as, but not limited to polyvinylchloride ("PVC"), polyethylene ("PE"), polyurethane ("PU"), polycarbonate ("PC") and/or polyetheretherketone ("PEEK"). Any rigid part of the car seat and the base may be made (e.g., machined, formed or cast) alternatively or additionally of any one or more metal, e.g., stainless steel, steel and/or aluminum. It should be noted that, in a variety of embodiments, any combination of materials can be used in the construction of the car seat system.

In many embodiments, the release mechanism is a generally four-sided structure, open on its top or bottom, wherein the release mechanism holds a first locking pin. The first locking pin clips into a first bracket held by the base when the car seat is locked to the base. The locking of the first locking pin to the first bracket creates two points of locking connection between the car seat and the base.

When the user pulls the release handle, the release handle in turn pulls the connected first members and release mechanisms. Moving the release mechanisms causes the first locking pins held by the release mechanisms to come free from the first brackets of the base. In this manner, two points of locking connection between the car seat and the base are disengaged.

A second member is provided for each side of the car seat. Each second member in a variety of embodiments attaches to a first connector, which extends up through the bottom of and into the inside of the four-sided release mechanism. The top of the base is formed with a projection, e.g., a generally U-shaped projection, which includes a pair of forked legs. A space between the forked legs of the projection in a variety of embodiments houses the first bracket that locks to the first locking pin. A first leg of the U-shaped projection of the base includes a ramped outer surface, which matches a ramped surface of the first connector attached to the second member. The ramped surface of the first connector extends to a spring-supporting wall of the first connector.

A compression spring is located between the spring-supporting wall of the first connector and an end of the generally four-sided release mechanism. A second, opposing end of the generally four-sided release mechanism extends around an outside of a second leg of the U-shaped projection from the base. When the infant car seat is locked to the base via the first locking pin held by the release mechanism being held by the first bracket of the base, the compression spring is maintained in a compressed state between the spring-supporting wall of the first connector and the mating end of the release mechanism. Here, the car seat is not able to be moved away from the base and the compression spring is not able to move the first connector and the associated second member.

After the user pulls the release handle, causing the first locking pins held by the release mechanisms to come free from the first brackets of the base, the user is able to lift the infant car seat up from the base. Doing so allows the compression spring to uncoil or decompress due to movement freedom provided by the engagement between the ramped surface of the first connector and the ramped outer surface of the one leg of the U-shaped projection. Because the second, opposing end of the generally four-sided release mechanism extends around an outside of the second leg of the U-shaped projection from the base, the compression spring is not able to move the release mechanism relative to the first connector. The compression spring is however able to push and translate the ramped surface of the first connector up along the ramped outer surface of the U-shaped projection of the base.

Translating the first connector in turn pulls the second member such that a second locking pin held within a second connector attached to the opposing end of the member from the first connector comes free from a second bracket held by the base. The second connectors and second brackets are provided on each side of the infant car seat system and provide third and fourth points of locking connection between the car seat and the base.

To remove of the infant car seat from the base, the user pulls the release handle to the first and second points of locking connection between the car seat and the base. The user then lifts the car seat from the base to disengage the third and fourth points of locking connection between the car seat and the base. The user is thereafter able to carry away the car seat from the base.

In a first primary embodiment, the first and second brackets point in a same direction. Here, the first and second members are moved in a same direction (towards the release handle end of the car seat) to unlock the first and second locking pins of the car seat from the first and second brackets of the base. It is thought that the four points of locking connection between the car seat and the base may be more structurally sound if the engagement openings formed in the first brackets point in a different direction than the engagement openings formed in the second brackets point. To do so, in a second primary embodiment, an inverting mechanism, e.g., pivoting wheel, and a third member are provided on each side of the car seat. The second member and the new third are connected to or formed with the inverting mechanism, such that moving the second member in a release direction towards that release handle end of the car seat rotates the inverting mechanism or wheel, which causes the new third member to move in an opposite direction towards an infant foot end of the car seat. So here, the second brackets may be reversed such that their engagement openings point towards an infant foot end of the car seat, whereas the first brackets' engagement openings continue to point towards the release handle end of the car seat as with the first primary embodiment.

Removal of the infant car seat from the base in the second primary embodiment is the same as the first primary embodiment, wherein the user pulls the release handle to disengage the first and second points of locking connection between the car seat and the base (first locking pins from first brackets pointing towards release end). The user then lifts the car seat from the base to disengage the third and fourth points of locking connection between the car seat and the base. The user is thereafter able to carry away the car seat from the base (second locking pins from first brackets pointing towards infant foot end).

To reattach the infant car seat to the base, the user places the car seat onto the base, both of which are configured to naturally guide the first locking pins to come to rest on top of the first brackets held by the base and to guide the second locking pins to come to rest on top of the second brackets held by the base. The first and second brackets are each in a variety of embodiments shaped similarly on top to slope downwardly towards the release handle end of the base. The first and second locking pins come to rest on the sloped edges of the first and second brackets.

The bridge member formed with or attached to the release handle, besides being connected to the members on either side of the car seat, is also attached to linkages on either side of the car seat that extend and connect to a handle end of the car seat. The compression springs discussed herein are in one embodiment are provided to bias the release handle in a closed position. Thus when the user pulls the release handle to release the first and second points of locking connection between the car seat and the base, the user pulls against the biasing of the compression springs.

To reattach the car seat, with the first and second locking pins resting on the sloped edges of the first and second brackets, the user presses down on the car seat relative to the base, wherein the lower body of the infant car seat is constrained to slide vertically into the base. The locking pins however slide downwardly and towards the release handle end of the car seat, along the sloped edges of the first and second brackets. The horizontal movement of the first and second locking pins of the release mechanisms in turn pushes the first members, bridge member and release handle towards the release handle end of the car seat, so as to in essence actuate the release handle as the user would do.

Once the first and second locking pins are pushed so as to clear the sloped edges of first and second brackets, the first and second locking pins fall beneath the first and second brackets, respectively. The compression springs are then able to decompress, causing the release handle to close and the bridge member, first members, release mechanisms and second members to move away from the handle end of the car seat. The first and second locking pins are in turn biased by the compression springs to move into locked positions directly beneath the first and second brackets, respectively.

In light of the disclosure set forth herein, and without limiting the disclosure in any way, in a first aspect of the present disclosure, which may be combined with any other aspect, or portion thereof, an infant car seat system includes comprising a base including a first pair of brackets and a second pair of brackets; and an infant car seat including a first pair of locking pins positioned and arranged to be locked via the first pair of brackets and a second pair of locking pins positioned and arranged to be locked via the second pair of brackets, the infant car seat further including a release handle configured to allow the user to unlock the first pair of locking pins from the first pair of brackets, after which the user is able to at least partially lift the infant car seat from the base, the at least partial lifting causing the second pair of locking pins to become unlocked from the second pair of brackets.

In a second aspect of the present disclosure, which may be combined with any other aspect, or portion thereof, the at least partial lifting causes compression springs to uncoil to unlock the second pair of locking pins from the second pair of brackets.

In a third aspect of the present disclosure, which may be combined with any other aspect, or portion thereof, the release handle is rotatably connected to the infant car seat.

In a fourth aspect of the present disclosure, which may be combined with any other aspect, or portion thereof, the release handle is spring biased to be in a closed or unactuated position.

In a fifth aspect of the present disclosure, which may be combined with any other aspect, or portion thereof, the infant car seat system includes first members extending from the release handle to first and second release mechanisms, respectively, the first and second release mechanisms holding one each of the first pair of locking pins.

In a sixth aspect of the present disclosure, which may be combined with any other aspect, or portion thereof, the first members extend from a bridge member formed with or attached to the release handle.

In a seventh aspect of the present disclosure, which may be combined with any other aspect, or portion thereof, the base includes first and second projections, the projections holding one each of the first pair of brackets, and wherein the first and second release mechanisms extend around the first and second projections, respectively.

In an eighth aspect of the present disclosure, which may be combined with any other aspect, or portion thereof, the first and second projections are generally U-shaped, the first and second release mechanisms extend around the U-shapes of the first and second projections, respectively.

In a ninth aspect of the present disclosure, which may be combined with any other aspect, or portion thereof, the first and second release mechanisms are generally four-sided structures open on top and bottom so as to be able to extend around the first and second projections, respectively.

In a tenth aspect of the present disclosure, which may be combined with any other aspect, or portion thereof, the infant car seat system includes second members extending from the first and second release mechanisms to one each of the second pair of locking pins.

In an eleventh aspect of the present disclosure, which may be combined with any other aspect, or portion thereof, each of the second members is formed with or attached to a connector that holds one each of the second pair of locking pins.

In a twelfth aspect of the present disclosure, which may be combined with any other aspect, or portion thereof, each of the second members is formed with or attached to a connector that includes a ramped surface that engages a ramped outer surface of one of the first and second projections.

In a thirteenth aspect of the present disclosure, which may be combined with any other aspect, or portion thereof, the infant car seat system includes first and second compression springs compressed between the connectors and the first and second release mechanisms, respectively, wherein the compression springs remain compressed until the user is able to at least partially lift the infant car seat from the base.

In a fourteenth aspect of the present disclosure, which may be combined with any other aspect, or portion thereof, the compression springs expanding due to the user at least partially lifting the infant car seat from the base cause the second members to pull one each of the second pair of locking pins from the second pair of brackets.

In a fifteenth aspect of the present disclosure, which may be combined with any other aspect, or portion thereof, the compression springs expanding due to the user at least partially lifting the infant car seat from the base is enabled by the user actuating the release handle to unlock the first pair of locking pins from the first pair of brackets.

In a sixteenth aspect of the present disclosure, which may be combined with any other aspect, or portion thereof, the ramped surfaces of the second members are able to slide against the ramped outer surfaces of the first and second projections when the user actuates the release handle to unlock the first pair of locking pins from the first pair of brackets.

In a seventeenth aspect of the present disclosure, which may be combined with any other aspect, or portion thereof, the base includes first and second infant foot end projections, the infant foot end projections holding one each of the second pair of brackets.

In an eighteenth aspect of the present disclosure, which may be combined with any other aspect, or portion thereof, the infant car seat system includes second members extending from the first and second release mechanisms, each second member extending to an inverting mechanism, e.g., rotatable wheel, and wherein a third member extends from the inverting mechanism to one of the second pair of locking pins.

In a nineteenth aspect of the present disclosure, which may be combined with any other aspect, or portion thereof, inverting mechanism, e.g., the rotatable wheel, is rotatably connected to the infant car seat.

In a twentieth aspect of the present disclosure, which may be combined with any other aspect, or portion thereof, each of the second members is formed with or attached to a connector that includes a ramped surface that engages a ramped outer surface of one of the first and second projections.

In a twenty-first aspect of the present disclosure, which may be combined with any other aspect, or portion thereof, the infant car seat includes first and second compression springs compressed between the connectors and the first and second release mechanisms, respectively, wherein the compression springs remain compressed until the user is able to at least partially lift the infant car seat from the base.

In a twenty-second aspect of the present disclosure, which may be combined with any other aspect, or portion thereof, the compression springs expanding due to the user at least partially lifting the infant car seat from the base cause the second members to pull one each of the second pair of locking pins from the second pair of brackets.

In a twenty-third aspect of the present disclosure, which may be combined with any other aspect, or portion thereof, the compression springs expanding due to the user at least partially lifting the infant car seat from the base is enabled by the user actuating the release handle to unlock the first pair of locking pins from the first pair of brackets.

In a twenty-fourth aspect of the present disclosure, which may be combined with any other aspect, or portion thereof, the ramped surfaces of the second members are able to slide against the ramped outer surfaces of the first and second projections when the user actuates the release handle to unlock the first pair of locking pins from the first pair of brackets.

In a twenty-fifth aspect of the present disclosure, which may be combined with any other aspect, or portion thereof, the release handle is further configured to allow the user to unlock a pair of latches from a corresponding pair of external carrier catches when the car seat is attaches to a stroller instead of the base.

In a twenty-sixth aspect of the present disclosure, which may be combined with any other aspect, or portion thereof, the pair of latches are biased into an external carrier locking position by a pair of compression springs, and wherein pulling the release handle compresses the compression springs.

In a twenty-seventh aspect of the present disclosure, which may be combined with any other aspect, or portion thereof, each of the second pair of locking pins is held by a connector, each second or third member extending to one of the connectors, and wherein a compression spring is located within each connector, the compression spring biased to push against the connector and an end of the respective second or third member.

In a twenty-eighth aspect of the present disclosure, which may be combined with any other aspect, or portion thereof, any of the features, functionality and alternatives described in connection with any one or more of FIGS. 1 to 19 may be combined with any of the features, functionality and alternatives described in connection with any other of FIGS. 1 to 19.

In light of the above aspects and the disclosure set forth herein, it is accordingly an advantage of the present disclosure to provide an improved infant car seat system.

It is another advantage of the present disclosure to provide an infant car seat system having four points of locking connection between the car seat and the base.

It is a further advantage of the present disclosure to provide an infant car seat system having an improved way of removing the car seat from the base.

Further still, it is an advantage of the present disclosure to provide a.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

First Primary Embodiment

Figure 1:
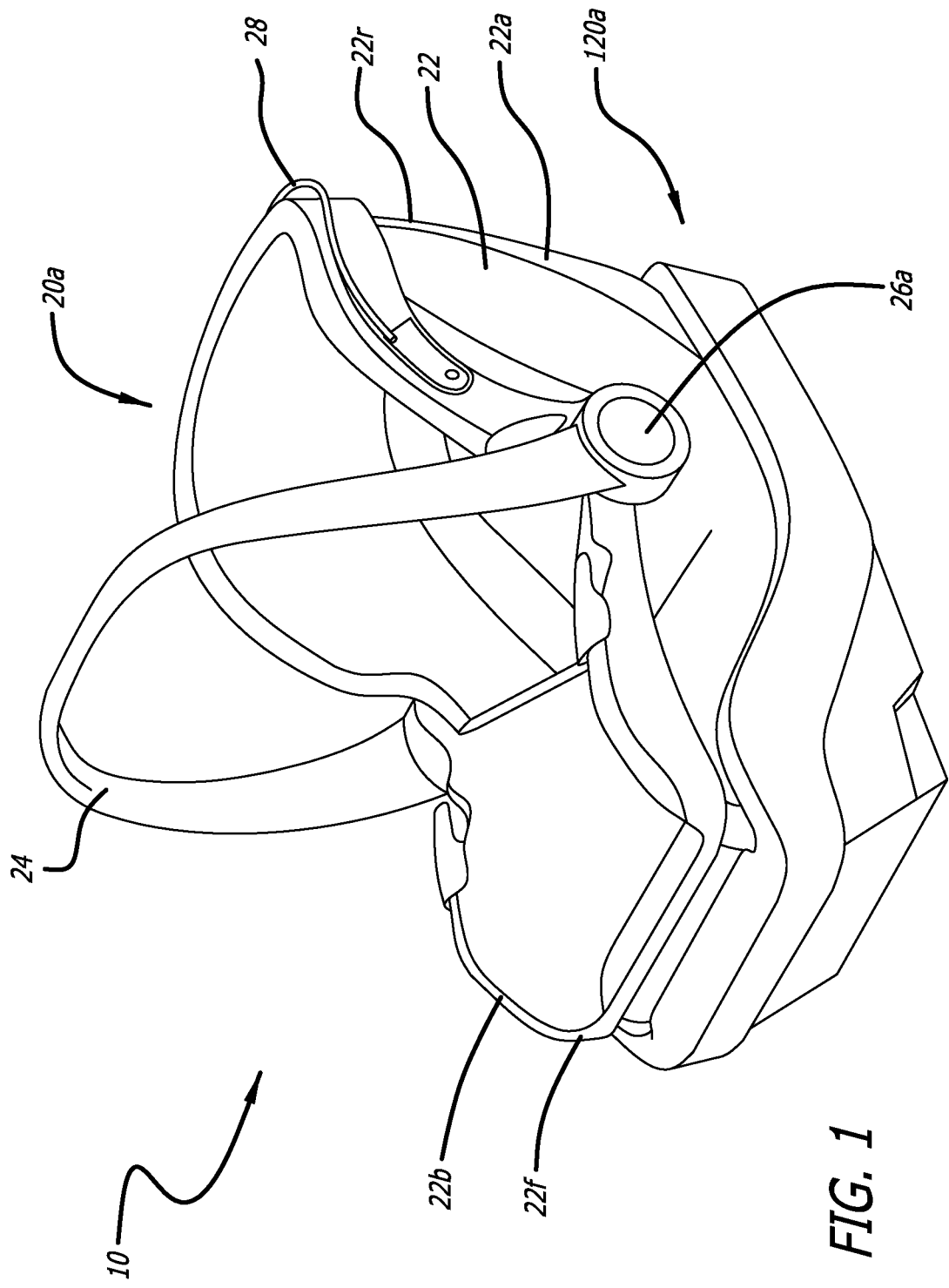
FIG. 1 is a perspective view of a first primary embodiment for an infant car seat system of the present disclosure including an infant car seat and a base.
Figure 2:
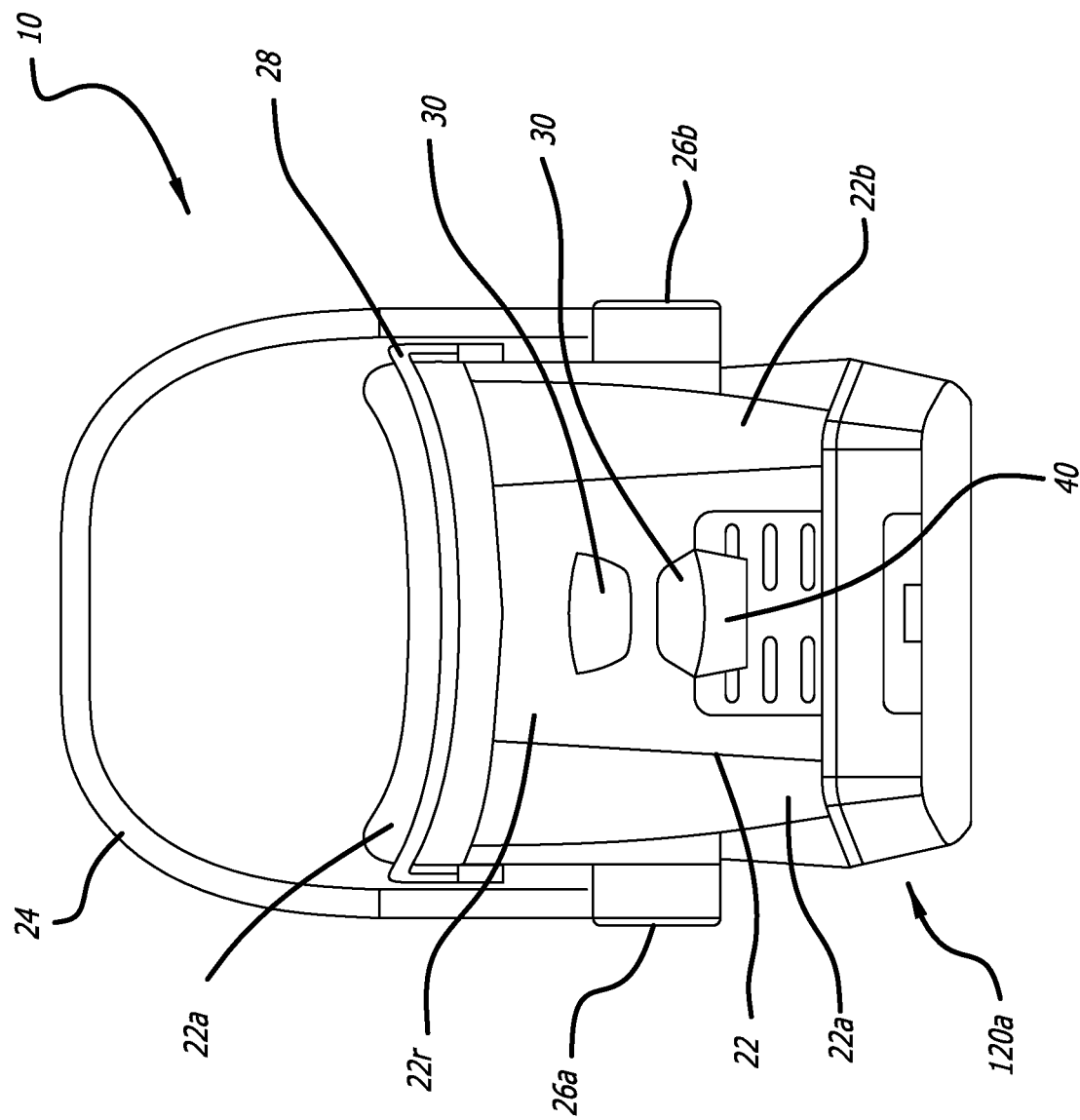
FIG. 2 is a release handle end elevation view of one embodiment for the infant car seat system of the present disclosure.
Figure 3:
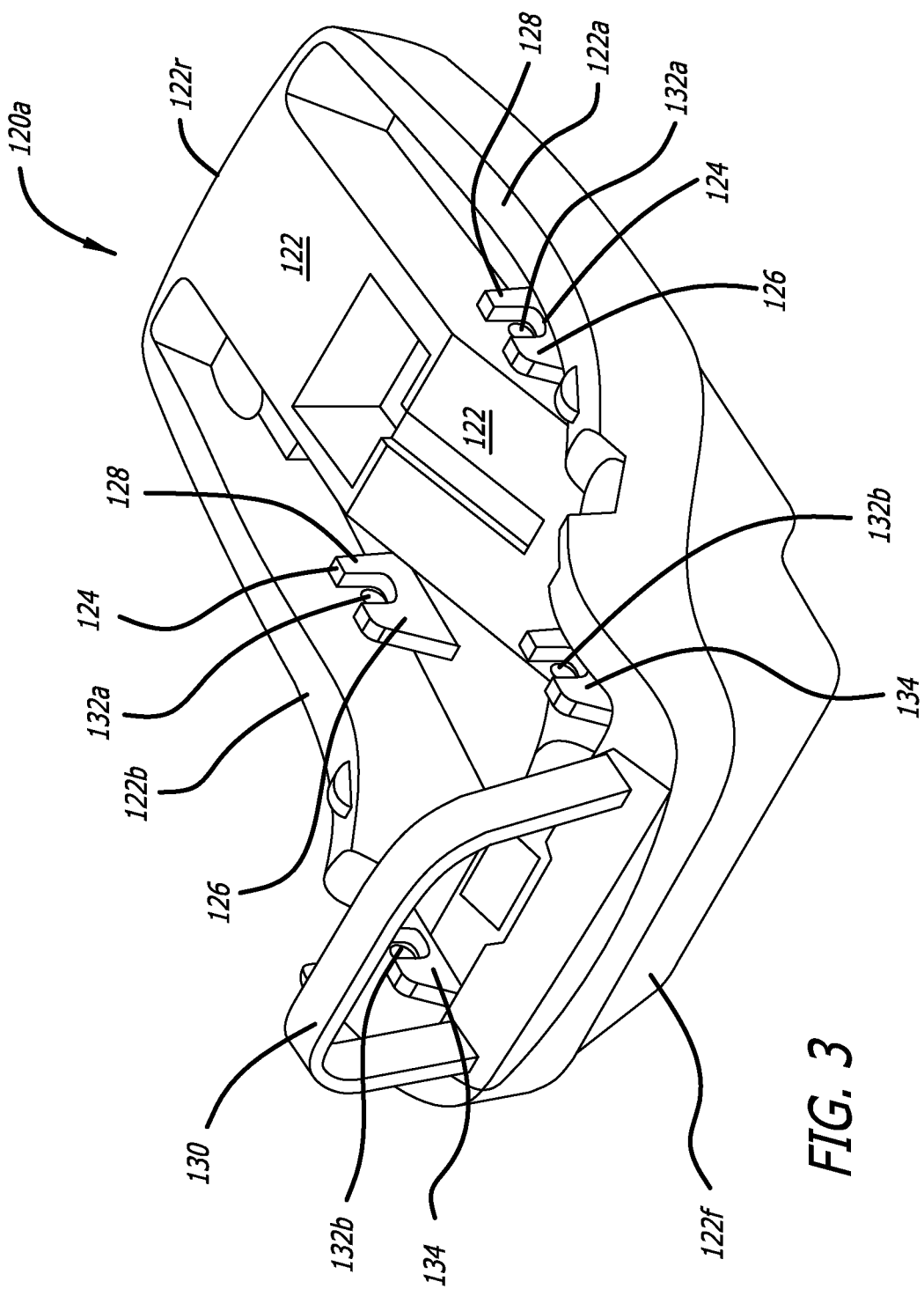
FIG. 3 is a perspective view of one embodiment for a base of the infant car seat system of the present disclosure.

Referring now to the drawings and in particular to FIGS. 1 to 3, a first primary embodiment for an improved infant car seat system 10 including an infant car seat 20*a* and a base 120*a* therefore is illustrated. FIGS. 1 and 2 illustrate an infant car seat 20*a* including an infant holding cradle 22 and a carrying handle 24 rotatably connected to infant holding cradle 22 via hinges 26*a*, 26*b*. FIGS. 1 and 2 illustrate that infant car seat 20*a* includes a canopy holding bar 28 rotatably connected to infant holding cradle 22. Cradle 22 in the illustrated embodiment includes a release handle end 22*r* and an infant foot end 22*f* and sides 22*a*, 22*b*. FIG. 2 illustrates that release handle end 22*r* of infant holding cradle 22 includes belt holding clips 30 that extend around a rear seat seatbelt to optionally hold infant car seat system 10 firmly in place in the rear seat of an automobile in one configuration.

FIG. 3 illustrates that each side of a top 122 of base 120*a* is formed with a projection 124 located roughly in the middle of top 122, e.g., a generally U-shaped projection, which includes a pair of forked legs 126, 128. Top 122 of base 120*a* includes sides 122*a*, 122*b*, a release handle end 122*r* and an infant foot end 122*f*, which match sides 22*a*, 22*b* and ends 22*r*, 22*f* of infant car seat 20*a*. Cradle 22 of infant car seat 20*a* releasably locks into the top 122 of base 120*a*. FIG. 3 further illustrates that infant foot end 122*f* of base 120*a* may optionally include an anti-rebound bar 130 for preventing the seat and base assembly from rotating into the vehicle seat in the case of an impact or crash, thereby protecting the child occupant from injury.

FIG. 3 further illustrates that forked legs 126 hold first brackets 132*a* (first pair of brackets). First brackets 132*a* may be molded into forked legs 126 or be connected to forked legs 126. First brackets 132*a* are made of metal in one embodiment. Top 122 of base 120*a* in the illustrated embodiment includes infant foot end projections 134, which likewise hold infant foot end or second brackets 132*b* (second pair of brackets). Infant foot end or second brackets 132*b* may likewise be molded into projections 134 or be connected to projections 134 and may be made of metal.

Any rigid or flexible part of car seat 20*a* and base 120*a* of the car seat system 10 of the present disclosure may be made (e.g., molded) of any one or more plastic, e.g., polyvinylchloride ("PVC"), polyethylene ("PE"), polyurethane ("PU"), polycarbonate ("PC") and/or polyetheretherketone ("PEEK"). Any rigid part of car seat 20*a* and base 120*a* may be made (e.g., machined, formed or cast) alternatively or additionally of any one or more metal, e.g., stainless steel, steel and/or aluminum. It should be noted that, in a variety of embodiments, any combination of materials can be utilized in the construction of the car seat system 10.

Figure 4:
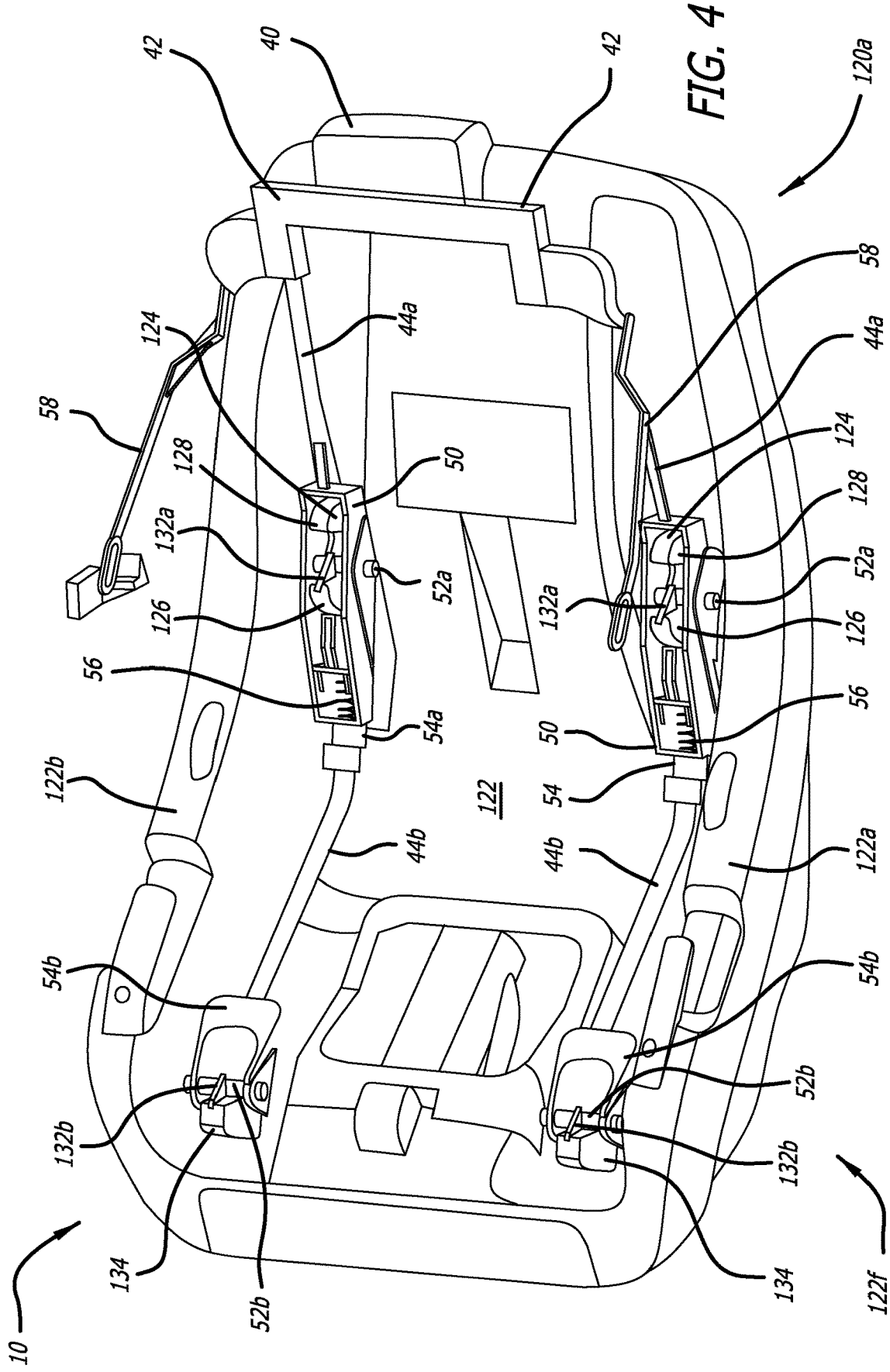
FIG. 4 is a further perspective view of one embodiment for an infant car seat system of the present disclosure including an infant car seat and a base, wherein a portion of the car seat is hidden to better illustrate certain features.

FIGS. 2 and 4 illustrate that car seat 20*a* includes a release handle 40, which the user pulls to release the car seat from first brackets 132*a* formed or attached to forked legs 126 of base 120*a*. Release handle 40 is formed with or connects to a bridge member 42, which splits to both sides 22*a*, 22*b* of the cradle 22 (removed in FIG. 4) of car seat 20*a*. In this manner, a single actuation of release handle 40 unlocks locking mechanisms 50 from first brackets 132*a* of base 120*a* on both sides 122*a*, 122*b* of the base. A first member 44a extends from each end of bridge member 42 to a release mechanism 50, such that a first member 44a and a release mechanism 50 reside on both sides 22a, 22b of car seat 20a. First member 44a may be formed with or attached to release mechanism 50.

Figure 6:
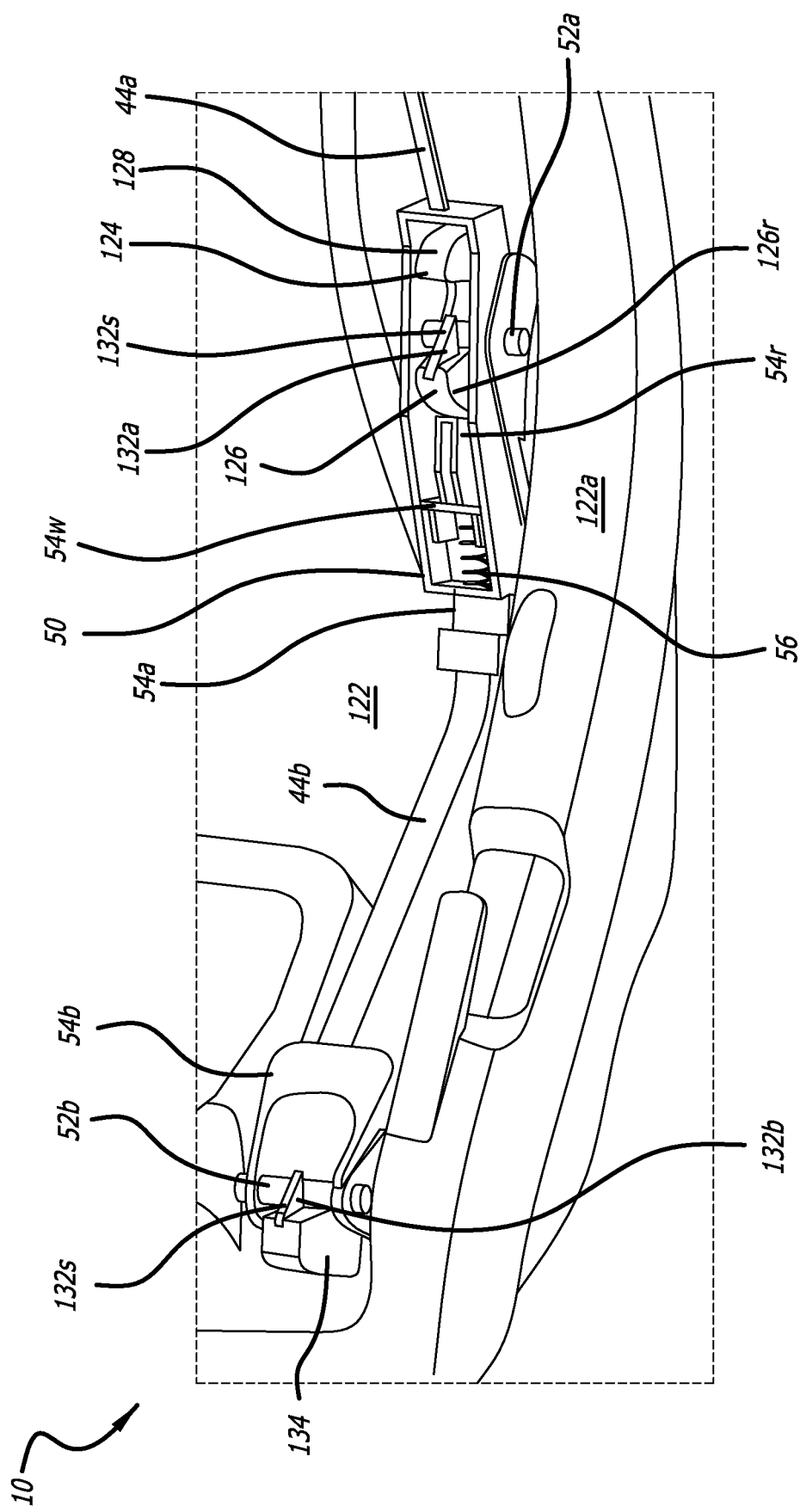
FIG. 6 is a cutaway perspective view of one embodiment for an infant car seat system of the present disclosure highlighting certain features.

FIGS. 4 and 6 illustrate that release mechanism 50 may generally be a four-sided structure, open on its top or bottom, wherein each release mechanism 50 holds a first locking pin 52a. First locking pin 52a clips into a first bracket 132a held by base 120a when car seat 20a is locked to the base. The locking of each first locking pin 52a to each first bracket 132a creates two points of locking connection between car seat 20a and base 120a.

When the user pulls release handle 40, the release handle in turn pulls connected first members 44a and the associated release mechanisms 50. Moving release mechanisms 50 causes first locking pins 52a held by the release mechanisms to come free from first brackets 132a of base 120a. In this manner, two points of locking connection between car seat 20a and base 120a are disengaged.

A second member 44b is provided for each side of car seat 20a. Each second member 44b in one embodiment is formed with or attaches to a first connector 54a, which extends up through the bottom of and into the inside of four-sided release mechanism 50. FIGS. 3 and 4 illustrate that each side of a top 122 of base 120a is formed with a projection 124, e.g., a generally U-shaped projection, which includes a pair of forked legs 126, 128. A space between forked legs 126, 128 of projection 124 in one embodiment houses first bracket 132a, which locks to first locking pin 52a. FIG. 6 illustrates that first leg 126 of the U-shaped projection 124 of base 120a includes a ramped outer surface 126r, which matches a ramped surface 54r of first connector 54a attached to second member 44b. Ramped surface 54r of first connector 54a extends to a spring-supporting wall 54w of the first connector.

A compression spring 56 is located between the spring-supporting wall 54w of first connector 54a and an end of generally four-sided release mechanism 50. A second, opposing end of generally four-sided release mechanism 50 extends around an outside of a second leg 128 of U-shaped projection 124 from base 120a. When infant car seat 20a is locked to base 120a via first locking pin 52a held by release mechanism 50 being held by the first bracket 132a of base 120a, compression spring 56 is maintained in a compressed state between the spring-supporting wall 54w of first connector 54a and the mating end of release mechanism 50. Here, car seat 20a is not able to be moved away from base 120a and compression spring 56 is not able to move first connector 54a and associated second member 44b.

After the user pulls release handle 40, causing first locking pins 52a (e.g., first pair of locking pins 52a) held by release mechanisms 50 to come free from the first brackets 132a of base 120a, the user is able to lift infant car seat 20a away from the base. Lifting the infant car seat 20a away from the base allows compression spring 56 to uncoil or decompress due to movement freedom provided by the engagement between ramped surface 54r of first connector 54a and the ramped outer surface 126r of first leg 126 of U-shaped projection 124. As the second, opposing end of generally four-sided release mechanism 50 extends around an outside of the second leg of U-shaped projection 124 from base 120a, the spring is not able to move release mechanism 50 relative to the first connector 54a. However, compression spring 56 is able to push and translate ramped surface 54r of first connector 54a up along the ramped outer surface 126r of first leg 126 of U-shaped projection 124 of base 120a.

Translating first connector 54a in turn pulls second member 44b such that a second locking pin 52b held within a second connector 54b formed with or attached to the opposing end of second member 44b from first connector 54a comes free from a second bracket 132b held by base 120a. Second connectors 54b and second brackets 132b are provided on each side of infant car seat system 10 and provide third and fourth points of locking connection between car seat 20a and base 120a.

To remove the infant car seat 20a from base 120a, the user pulls release handle 40 to disengage the first and second points of locking connection between car seat 20a and base 120a (removal of first locking pins 52a from first brackets 132a). The user then lifts car seat 20a from base 120a to disengage the third and fourth points of locking connection between car seat 20a and base 120a (removal of second locking pins 52b from second brackets 132b). The user is thereafter able to carry away car seat 20a from base 120a, e.g., via carrying handle 24.

To reattach infant car seat 20a to base 120a, the user places the car seat onto the base, both of which are configured to naturally guide first locking pins 52a to come to rest on top of first brackets 132a held by base 120a and to guide second locking pins 52b (second pair of locking pins 52b) to come to rest on top of second brackets 132b held by the base. First and second brackets 132a, 132b are each shaped in one embodiment similarly on top to slope downwardly towards release handle end 122r of base 120a. The first and second locking pins 52a, 52b come to rest on the sloped edges 132s of first and second brackets 132a, 132b.

Figure 5A:
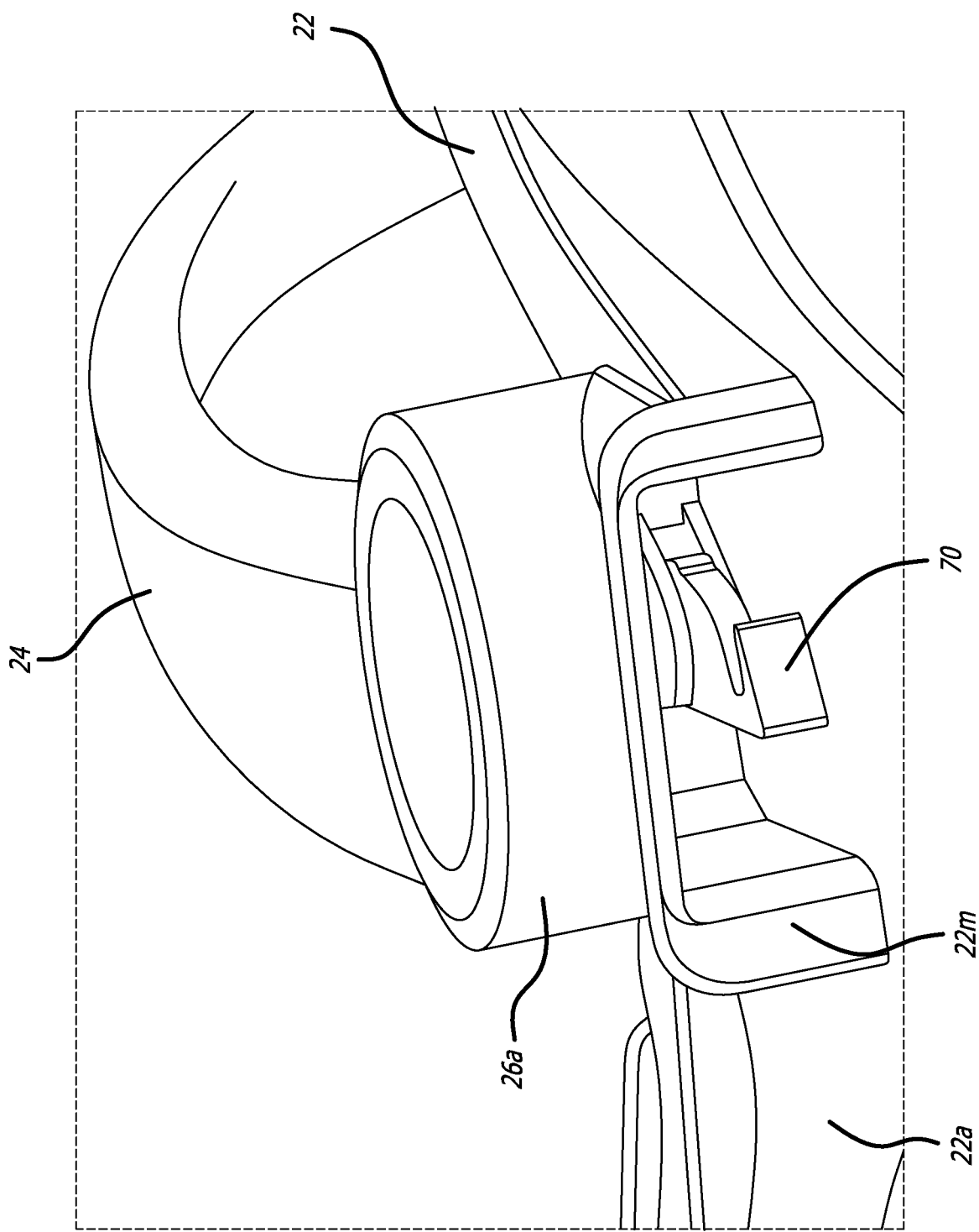
FIG. 5A is a bottom-up view of an embodiment for a mount including a spring-loaded latch that slides releasably lockingly onto an external carrier, such as a stroller or wagon.

FIG. 4 illustrates that bridge member 42 formed with or attached to release handle 40, besides being connected to members 44a on either side of car seat 20a, is also attached to linkages 58 located on either side 22a, 22b of car seat 20a, where the linkages extend and connect to latches 70 that latch car seat 20a (and car seat 20b discussed below) to an external stroller, wagon or other desired carrier (not illustrated). FIG. 5A illustrates a relevant portion of side 22a of cradle 22 of the car seat. For reference, carrying handle 24 and hinge 26a are illustrated to show that the handle and hinge attach to a mount 22m, which is formed with or attached to each side 22a, 22b of cradle 22 of the car seat. Mount 22m is open at the bottom so that the mount may slide downwardly onto a mating structure, e.g., catch, of the external stroller, wagon or other carrier. Latches 70 mentioned above are located surrounded by mounts 22m. In one embodiment, when car seat 20a (and 20b below) is set onto the external stroller, wagon or other carrier, latches 70 automatically lock into place with the external mating structure, e.g., catch.

Figure 5B:
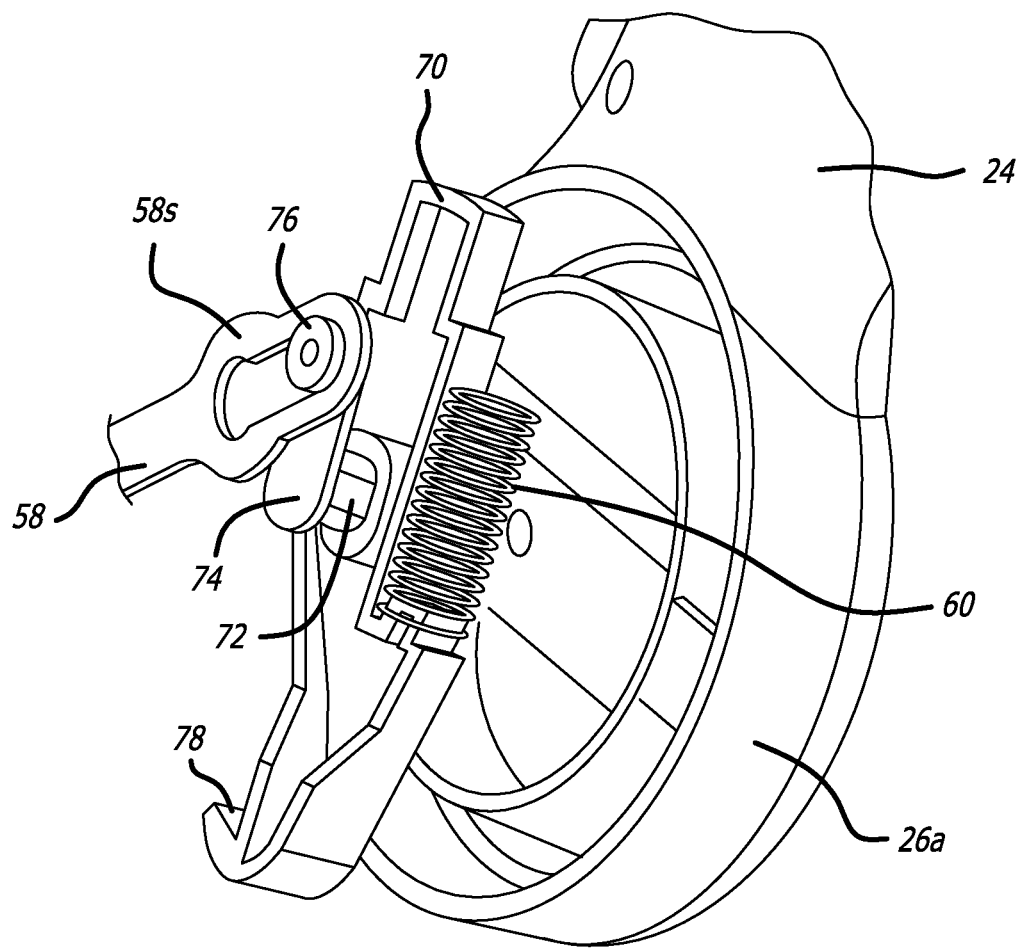
FIGS. 5B and 5C are sectioned perspective views illustrating the spring-loaded latch of FIG. 5A in more detail.
Figure 5C:
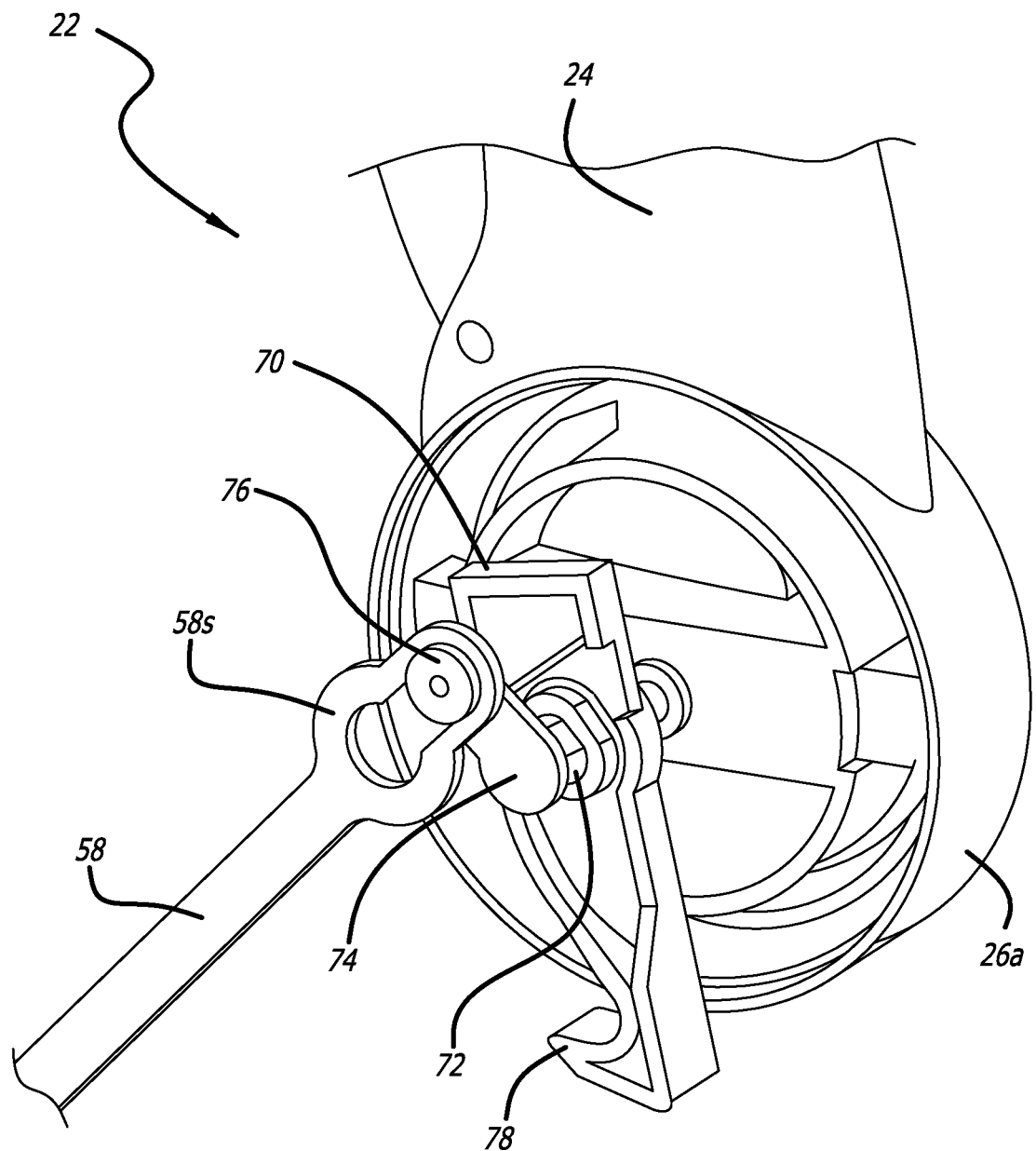

FIGS. 4, 5B, 5C and 10 illustrate that linkages 58 allow release handle 40 to not only partially release car seat 20a from base 120a, but also to release car seat 20a (and car seat 20b) from the external stroller wagon or other carrier. In this manner, only one release handle is needed. FIGS. 5B and 5C illustrate that a pivot 72 is formed with or attached to each latch 70. Pivot 72 is pivotally connected to mounts 22m of cradle 22 of the car seat. Pivot arm 74 extends from pivot 72 (attached to of formed with). A distal end of pivot arm 74 includes a head 76 that is displaced a distance from pivot arm 74 so that a groove is formed between pivot arm 74 and head 76. Each linkage 58 terminates at a keyed slot 58s, which includes a larger diameter end that is able to extend over the head 76 during manufacture. Keyed slot 58s includes a smaller diameter end sized to fit into the groove between pivot arm 74 and head 76, so that the keyed slot end of linkage 58 is held slidingly in place during operation. Each latch 70 also includes a hook end 78 for releasably locking to the external mating structure, e.g., catch, of the external stroller, wagon or other carrier. FIGS. 5B and 5C further illustrate that compression springs 60 are provided to bias external carrier latches 70 into locking positions with their respective external mating structures.

FIGS. 4, 5B and 5C illustrate that when car seat 20a (and car seat 20b) is latched into an external carrier instead of base 120a, and the user pulls release handle 40, linkages 58 are also pulled (from right-to-left in FIGS. 5B and 5C), so as to rotate latch 70 (including pivot 72, pivot arm 74 and head 76) in a counterclockwise direction about pivot 72 in FIGS. 5B and 5C, and so as to compress compression spring 60. Hook end 78 of latch 70 in turn rotates free from the external mating structure, e.g., catch, of the external stroller, wagon or other carrier. The user can remove car seat 20a (and car seat 20b) from the external carrier while release handle 40 is pulled. When the user lets go of the release handle 40, compression springs 60 axially decompress, moving the latches (not illustrated) back into their external carrier locking positions.

Also, when the user lets go of the release handle 40, compression springs 56 (FIGS. 4 and 6) push release handle 40 back into its closed position. Compression springs 56, 60 are accordingly biased to maintain release handle 40 in its normally closed position. Thus when the user pulls release handle 40 to release the first and second points of locking connection between car seat 20a and base 120a, the user pulls against the biasing of compression springs 56, 60. Compression springs 56, 60 return release handle 40 to its closed or unactuated position when the user lets go of the handle.

To reattach car seat 20a to base 120a, with first and second locking pins 52a, 52b resting on the sloped edges 132s of first and second brackets 132a, 132b, the user presses down on car seat 20a relative to base 120a, wherein the lower body of infant car seat 20a is constrained to slide vertically into base 120a. Locking pins 52a, 52b however slide downwardly and horizontally towards the release handle end 22r of car seat 20a along sloped edges 132s of first and second brackets 132a, 132b. The horizontal movement of first and second locking pins 52a, 52b of release mechanisms 50 in turn pushes first members 44a, bridge member 42 and release handle 40 towards the release handle end 22r of car seat 20a. Second members 44b are in turn pulled towards the release handle end 22r of car seat 20a.

Once first and second locking pins 52a, 52b are pushed so as to clear the sloped edges 132s of first and second brackets 132a, 132b, first and second locking pins 52a, 52b fall beneath first and second brackets 132a, 132b, respectively. Compression springs 56 are then able to decompress, causing release handle 40 to close and bridge member 42, first members 44a, release mechanisms 50 and second members 44b to move away from the release handle end 22r and towards infant foot end 22f of car seat 20a. First and second locking pins 52a, 52b are in turn biased by compression springs 56 to move into locked positions directly beneath first and second brackets 132a, 132b, respectively.

Second Primary Embodiment

Figure 7:
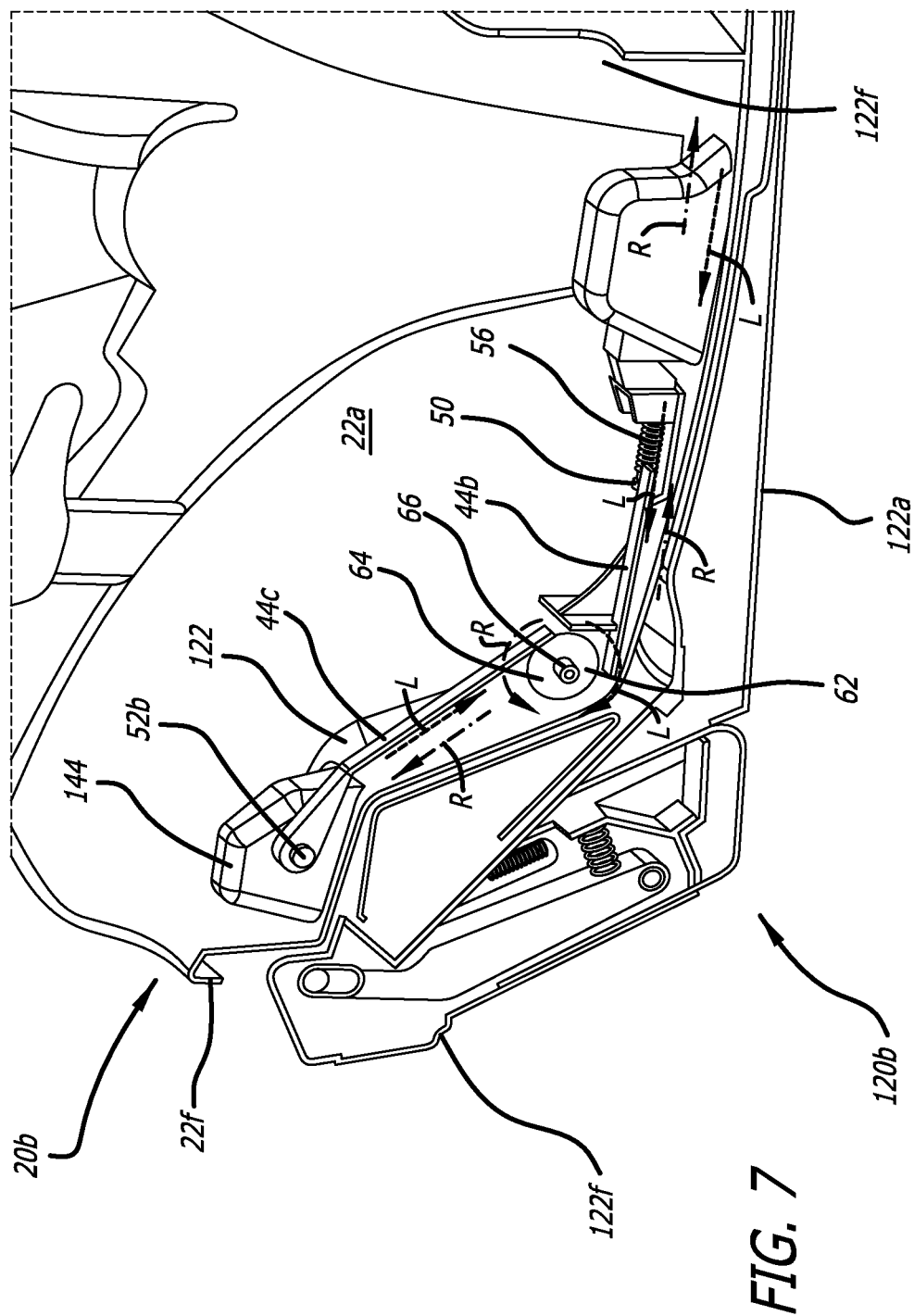
FIG. 7 is a cutaway perspective view of a portion of a second primary embodiment for an infant car seat system of the present disclosure having an alternative infant car seat, an alternative base, and an alternative structure and method for releasing the alternative infant car seat from the alternative base.
Figure 8:
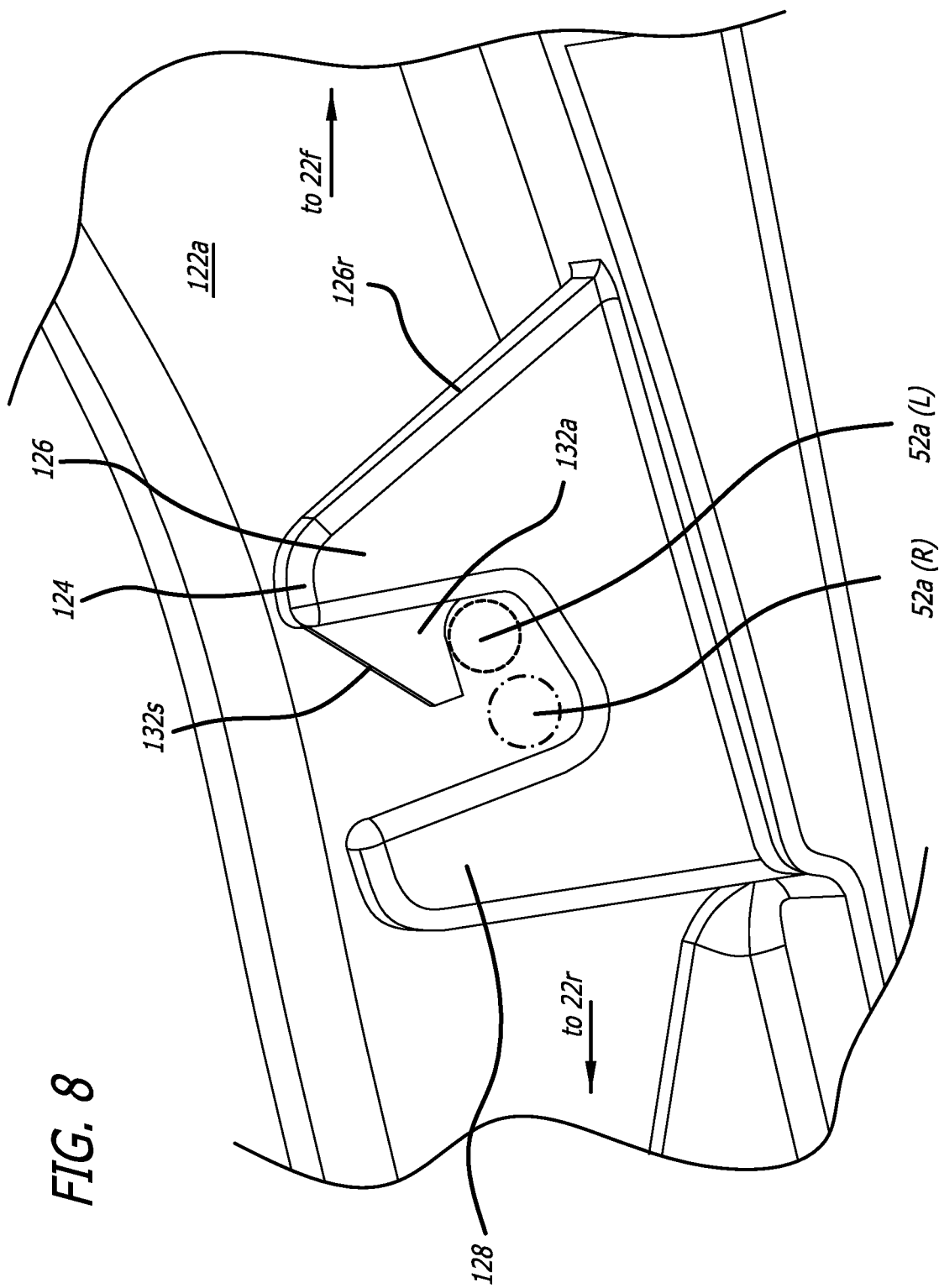
FIG. 8 is a cutaway perspective view illustrating that the infant car seat system of the present disclosure uses the same generally U-shaped projection holding the same first bracket as described herein for the first primary embodiment for the infant car seat system of the present disclosure.
Figure 9:
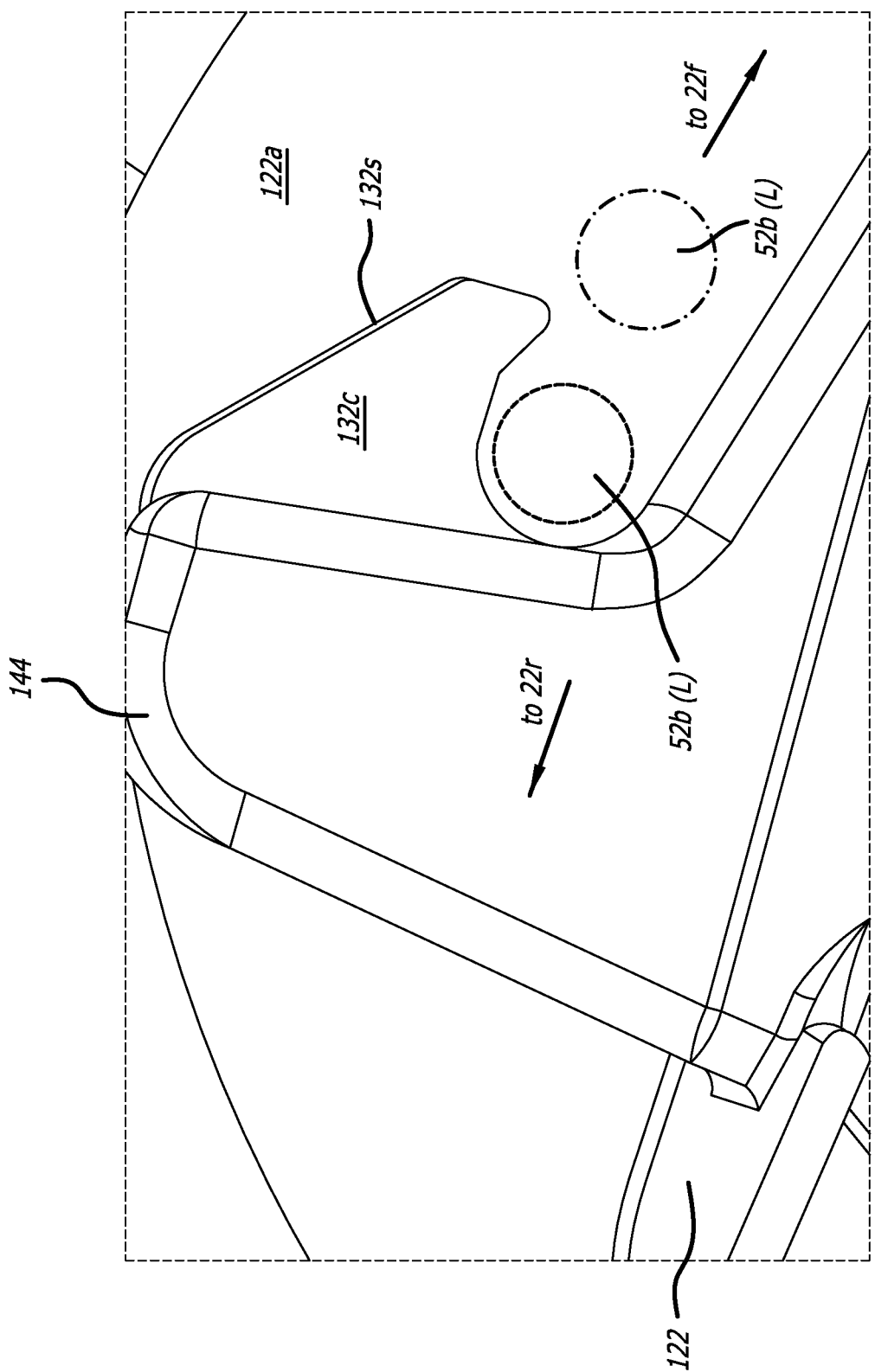
FIG. 9 is a cutaway perspective view illustrating an alternative foot end projection holding an alternative foot end bracket used in the alternative infant car seat system of the present disclosure.
Figure 10:
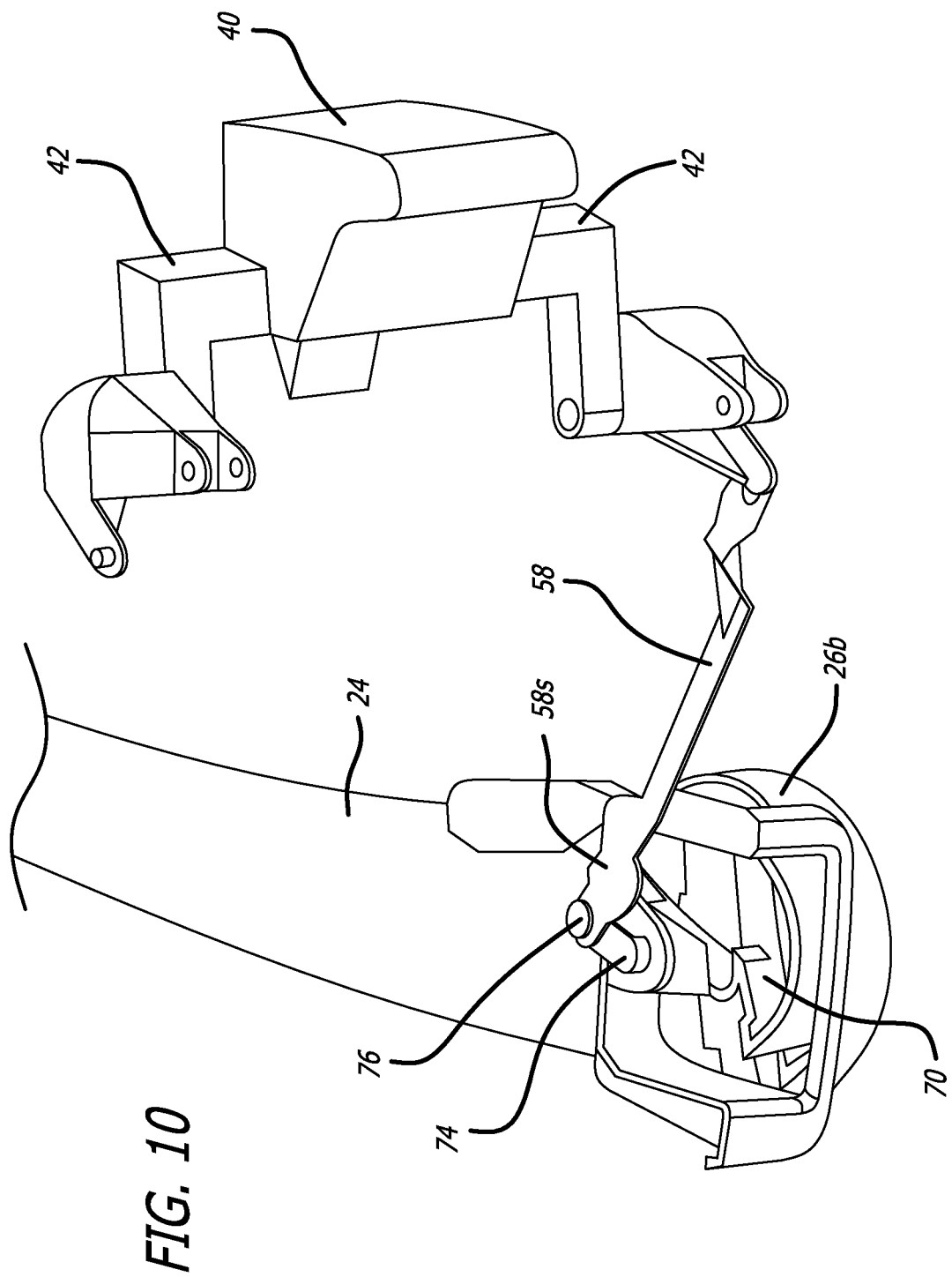
FIG. 10 is a cutaway perspective illustrating an embodiment for release handle and its connection to a latch for releasably locking to an external mating structure, e.g., stroller, wagon or other carrier.

Referring now to FIGS. 7 to 9, a second primary embodiment for an improved infant car seat system 110 including an infant car seat 20b and a base 120b therefore is illustrated. In a number of embodiments, the releasing structure and methodology for infant car seat system 110 is the same as for infant car seat system 10 all the way up to second members 44b, including release handle 40, bridge member 42, and on both sides 22a, 22b of cradle 22 of infant car seat 20b: (i) a first member 44a, (ii) release mechanism 50, (iii) a first connector 54a including spring-supporting wall 54w and ramped surface 54r, and (iv) a compression spring 56. FIG. 8 illustrates that infant car seat system 110 includes on both sides 122a, 122b of top 122 of base 120b: (i) a generally U-shaped projection 124 including forked legs 126, 128, wherein forked leg 126 includes a ramped outer surface 126r, and (ii) a first bracket 132a held by forked leg 126, wherein first bracket 132a includes a sloped edge 132s. FIG. 8 also illustrates that the release of first locking pin 52a (shown in cross-section) of car seat 20b is in a direction towards release handle end 22r from a locked position (L) beneath first bracket 132a to a released position (R) outside of first bracket 132a. The release of both first locking pins 52 pins for system 110 is via a single pull of release handle 40.

FIG. 7 illustrates that each second member 44b, terminates at a connection 62 to an inverting mechanism 64, e.g., wheel, which rotates about an axis 66. Inverting mechanism 64 is rotatably coupled to axis 66. A third member 44c is attached to or formed with inverting mechanism 64 and extends so as to hold to locking pin 52b at an alternative foot end projection 144 formed in the top 122 of base 120b.

When release handle 40 is not actuated, each compression spring 56 pulls a first locking pin 52a into a first bracket 132a as illustrated by the lock arrows (L) in FIG. 7 and towards foot end 22f of car seat 20b as shown in FIG. 8. When release handle 40 is not actuated, each compression spring 56 also pushes a second member 44b, which in turn rotates the corresponding inverting mechanism 64, e.g., wheel, in a counterclockwise locking direction (L) about axis 66. The counterclockwise rotation of inverting mechanism 64, e.g., wheel, in turn pulls third member 44c in an angled, downward locking direction (L), which pulls foot end locking pin 52b into an alternative foot end bracket 132c in a direction towards release handle end 22r as illustrated in FIG. 9. The provision of inverting mechanism 64, e.g., wheel, effectively reverses the locking direction (L), so that alternative foot end brackets 132c may be mounted in reverse (pointing towards infant foot end 22f of car seat 20b) as illustrated in FIG. 9. In many embodiments, this orientation of the foot end brackets 132c improves the safety and reliability of the infant car seat system 110 in the event of an accident as the force of the accident urges the foot end locking pins 52b into engagement with the foot end brackets 132c, thereby preventing the infant car seat from becoming disengaged from the base as a result of the accident.

FIG. 9 illustrates that alternative foot end brackets 132c point in an opposite direction to the pointing direction of first brackets 132a in FIG. 8. Such configuration is believed to be structurally advantageous to the brackets 132a, 132b pointing in the same direction for system 10 as illustrated for example in FIG. 6. FIG. 9 illustrates that the counterclockwise rotation of inverting mechanism 64, e.g., wheel, in FIG. 7 pulls third member 44c in an angled, downward locking direction (L), which in turn pulls foot end locking pin 52b into a locked position (L) within alternative foot end bracket 132c.

When release handle 40 is actuated, each member 44a pulls a first locking pin 52a from a first bracket 132a towards release handle end 22r as illustrated by the release arrows (R) in FIG. 7 and as shown in FIG. 8. The user is then able to lift car seat 20b from base 120b. The lifting enables each compression spring 56 to uncoil or decompress as discussed above for system 10. The uncoiling or decompression of each compression spring 56 pulls second member 44b, which in turn rotates the corresponding inverting mechanism 64, e.g., wheel, in a clockwise locking direction (R) about axis 66. The clockwise rotation of inverting mechanism 64 pushes third member 44c in an angled, upward unlocking or releasing direction (R), which in turn pushes foot end locking pin 52b out from underneath alternative foot end bracket 132c in a direction towards infant foot end 22f as illustrated in FIG. 9. The two user actions in system 110, namely, (i) release handle 40 pulling and (ii) car seat 20b lifting, release two points of locking connection each, allowing car seat 20b to be lifted away from base 120b.

FIGS. 8 and 9 illustrate that first brackets 132a and alternative foot end brackets 132c each have sloped edges 132s, which enable car seat 20b to be releasably locked back onto base 120b as discussed above for system 10.

Alternative First Primary Embodiment

Figure 11:
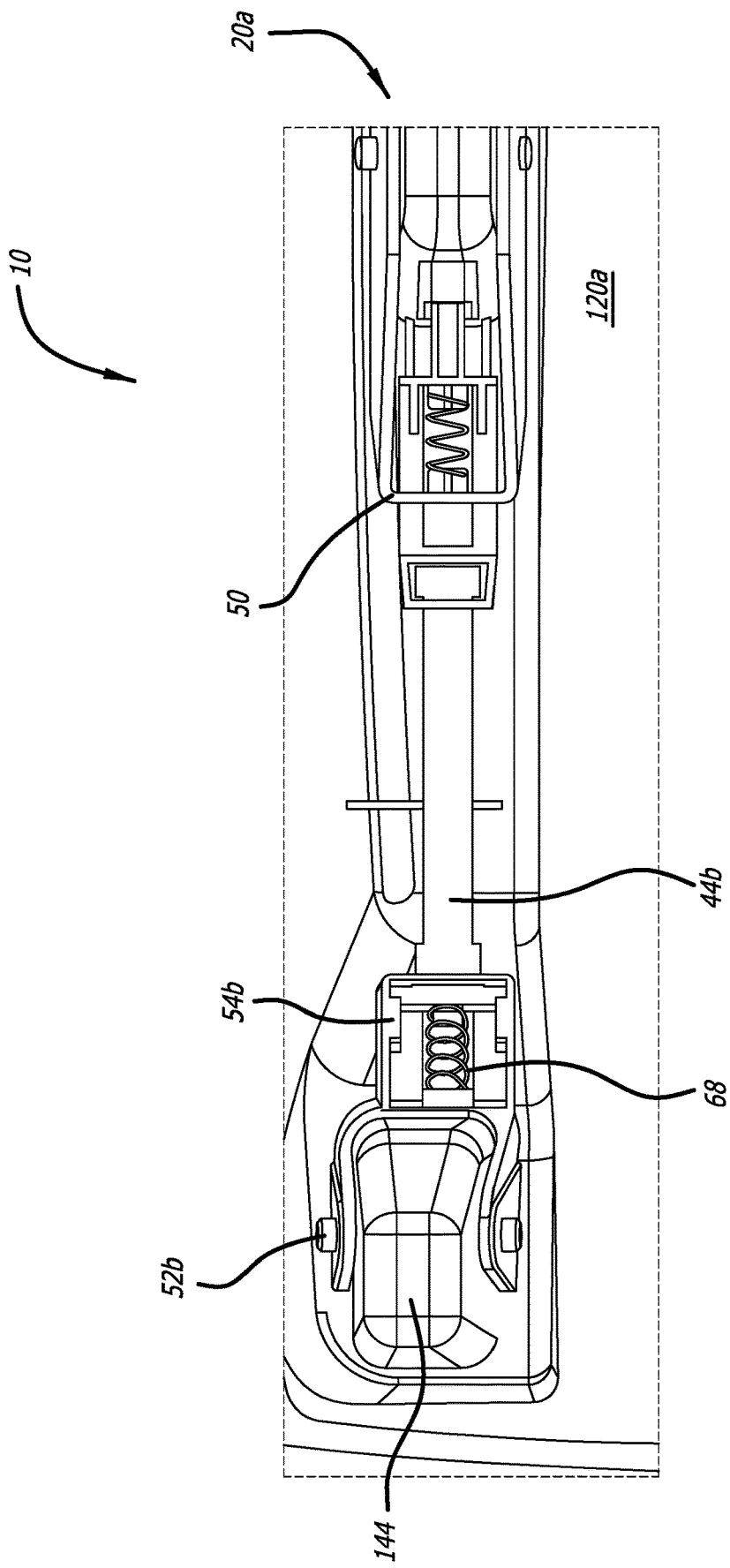
FIG. 11 is a top view of an alternative for the first primary embodiment for the disengagement of the infant car seat from the base.
Figure 12:
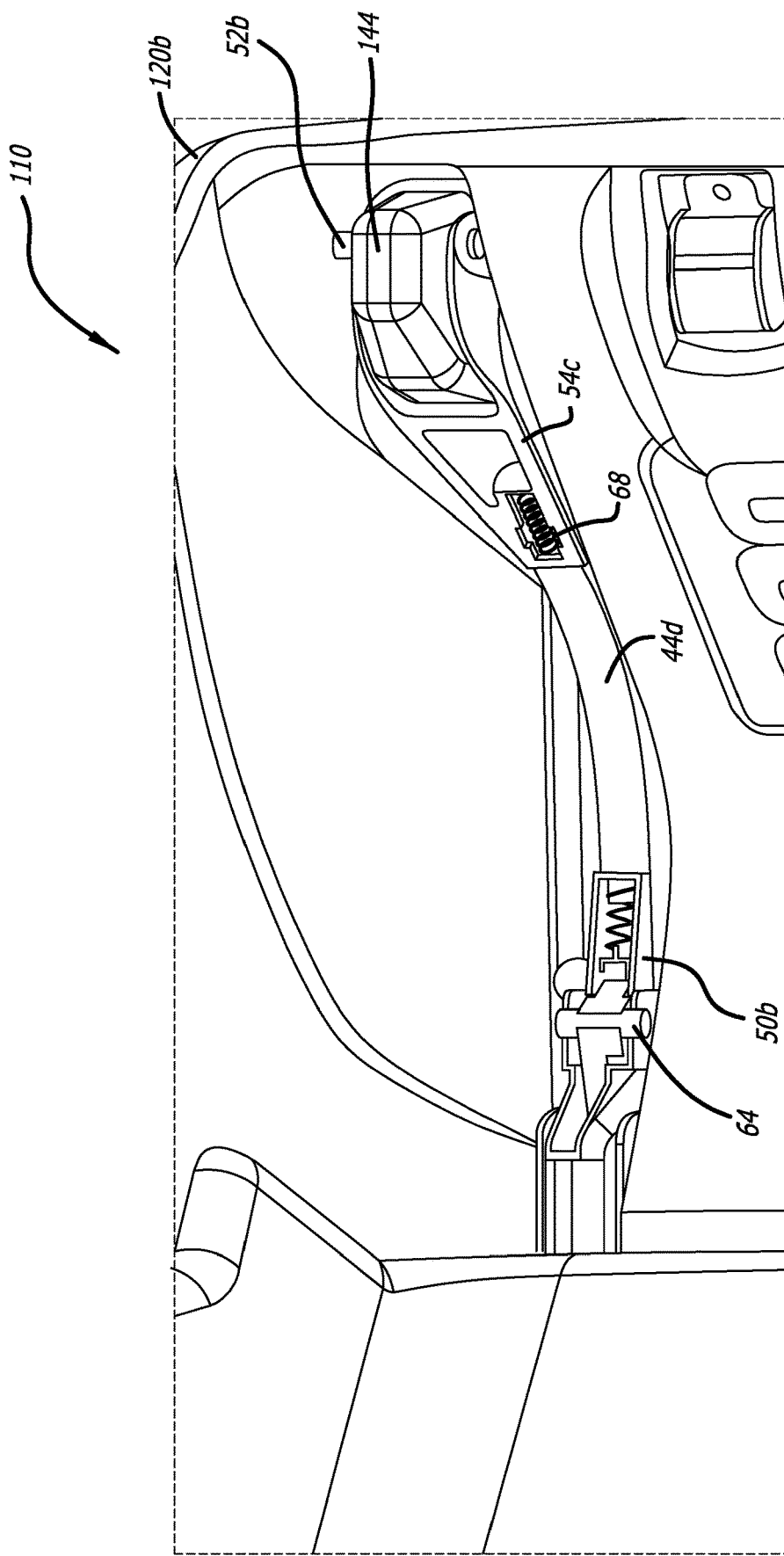
FIGS. 12 to 19 are different views of an alternative for the second primary embodiment for the disengagement of the infant car seat from the base.
Figure 13:
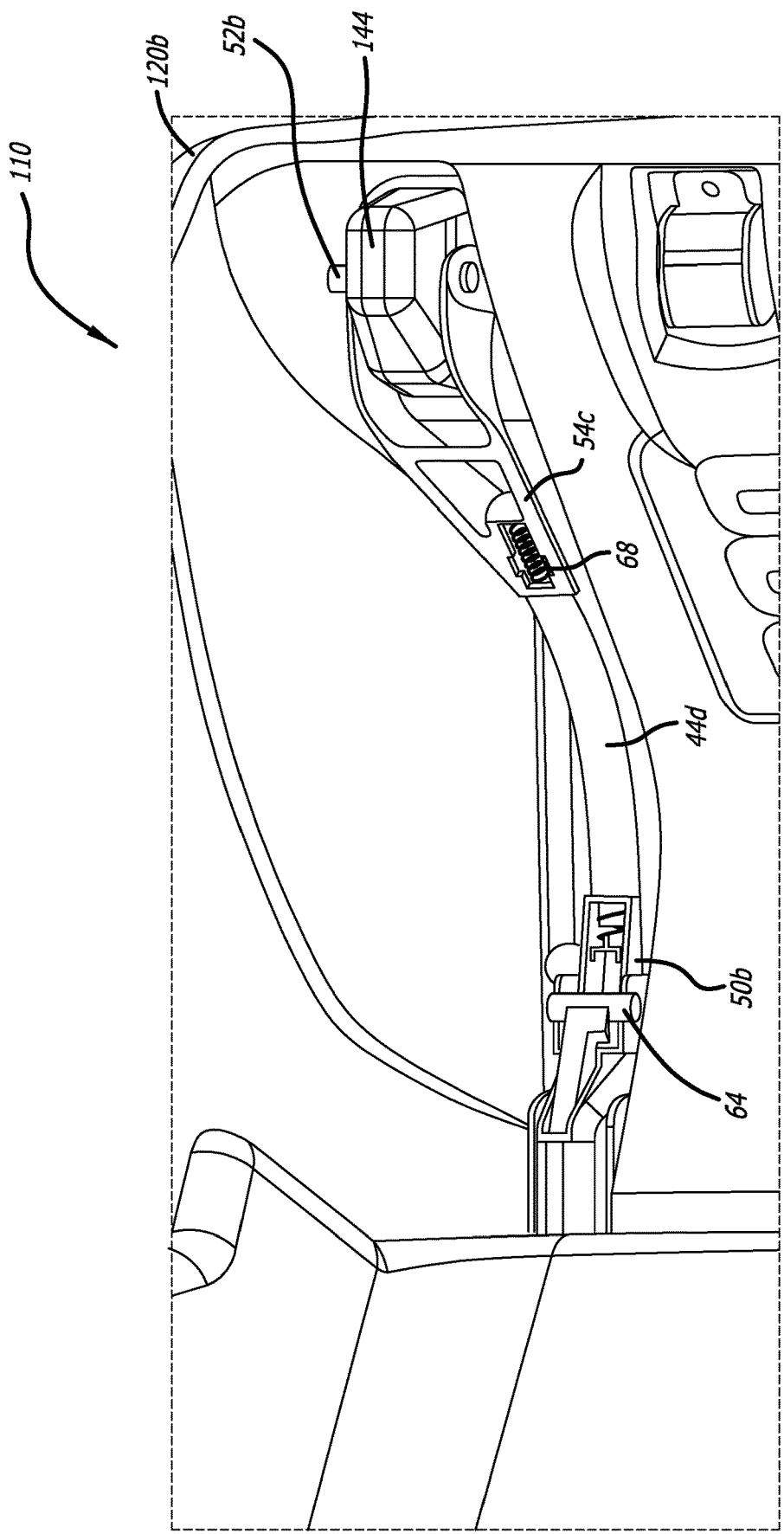

Referring now to FIG. 11, an alternative first primary embodiment for system 10 having car seat 20a and base 120a is illustrated. For reference, locking mechanism 50, second member 44b, second connector 54b, and second locking pin 52b are illustrated. Second bracket 132b of base 120a under which locking pin 52b locks is hidden from view in FIG. 11 by foot end projection 144. The additional structure of the alternative embodiment of FIG. 11 includes an additional compression spring 68 located within second connector 54b and positioned so as to bias second connector 54b away from the mating end of second member 44b, i.e., biased so as to push against both second connector 54b and the mating end of second member 44b.

Biasing second connector 54b away from or against the mating end of second member 44b enables engagement of the second locking pin 52b with the second bracket 132b even if the second locking pin 52b is moved into the locked position before clearing the engagement portion (e.g., hook) of the second bracket 132b (hidden). In other words, in the situation where, for whatever reason, the second member 44b translates and moves the second connector 54b from an unlocked into a locked position prior to the foot end of the car seat being fully engaged with the base, the second connector 54b would be misaligned with the second bracket 132b, and therefore not functionally engaged or locked.

Such a configuration is ameliorated by way of biasing second connector 54b, which enables the second locking pin 52b to translate relative to the second member 44b via compression spring 68. As illustrated in FIG. 6, the second bracket 132b includes a sloped edge 132s. Therefore, if the second locking pin 52b is in a locked state before the foot end of the car seat has fully engaged with the base, pin 52b will ride down sloped edge 132s as the car seat is lowered completely onto the base. Due to the biasing connector 54b enabling relative movement of the second locking pin 52b with respect to the second member 44b, the second locking pin 52b can ride down the sloped edge 132s by compressing spring 68 without being constrained by second member 44b. After the second locking pin 52b rides completely down the lower shoulder defined at the terminus end of sloped edge 132s of second bracket 132b, the biasing force of spring 68 urges the second locking pin 52b into the proper locked position beneath the second bracket 132b.

Alternative Second Primary Embodiment

Referring now to FIGS. 12 to 15, an alternative second primary embodiment for system 110 having car seat 20b and base 120b is illustrated. For reference, locking mechanism 50b, toe member 44d, third connector 54c, and second locking pin 52b are illustrated. Second bracket 132b of base 120b under which locking pin 52b locks is hidden from view in FIGS. 12 and 13 by foot end projection 144, but visible in FIGS. 14 and 15. The additional structure of the alternative embodiment of FIGS. 12 to 15 includes an additional compression spring 68 located within third connector 54c and positioned so as to bias third connector 54c away from the mating end of toe member 44d, i.e., biased so as to push against both third connector 54c and the mating end of toe member 44d. It should be appreciated that the compression spring 68 in FIGS. 12 to 15 accomplishes the same function as the Alternative First Primary Embodiment described in FIG. 11 and above. The primary distinction between the FIG. 11 embodiment and that of FIGS. 12 to 15 is that the second bracket 132b is mirrored in the alternative second primary embodiment (i.e., the hook opens toward the foot end of the car seat rather than toward the head end of the car seat). As a result, the biasing third connector 54c in FIGS. 12 to 15 translates relative to toe member 44d by extending spring 68 rather than compressing spring 68 (as in the FIG. 11 embodiment). For example, if the car seat is incorrectly loaded, extended spring 68 may translate the biasing third connector 54c toward the foot end of the car seat thereby positioning second locking pin 52b to be pulled into engagement with second bracket 132b.

Biasing third connector 54c away from or against the mating end of toe member 44d enables engagement of the second locking pin 52b with the second bracket 132b even if the second locking pin 52b is moved into the locked position before clearing the engagement portion (e.g., hook) of the second bracket 132b (hidden). In other words, in the situation where, for whatever reason, the toe member 44d translates and moves the third connector 54c from an unlocked into a locked position prior to the foot end of the car seat being fully engaged with the base, the third connector 54c would be misaligned with the second bracket 132b, and therefore not functionally engaged or locked.

Such a configuration is ameliorated by way of biasing third connector 54c, which enables the second locking pin 52b to translate relative to the toe member 44d by extending compression spring 68. As illustrated in FIG. 6, the second bracket 132b includes a sloped edge 132s. Therefore, if the second locking pin 52b is in a locked state before the foot end of the car seat has fully engaged with the base, pin 52b will ride down sloped edge 132s as the car seat is lowered completely onto the base. Due to the biasing third connector 54c enabling relative movement of the second locking pin 52b with respect to the toe member 44d, the second locking pin 52b can ride down the sloped edge 132s by extending compression spring 68 without being constrained by toe member 44d. After the second locking pin 52b rides completely down the lower shoulder defined at the terminus end of sloped edge 132s of second bracket 132b, the biasing force of uncoiled compression spring 68 pulls the second locking pin 52b into the proper locked position beneath the second bracket 132b.

Figure 14:
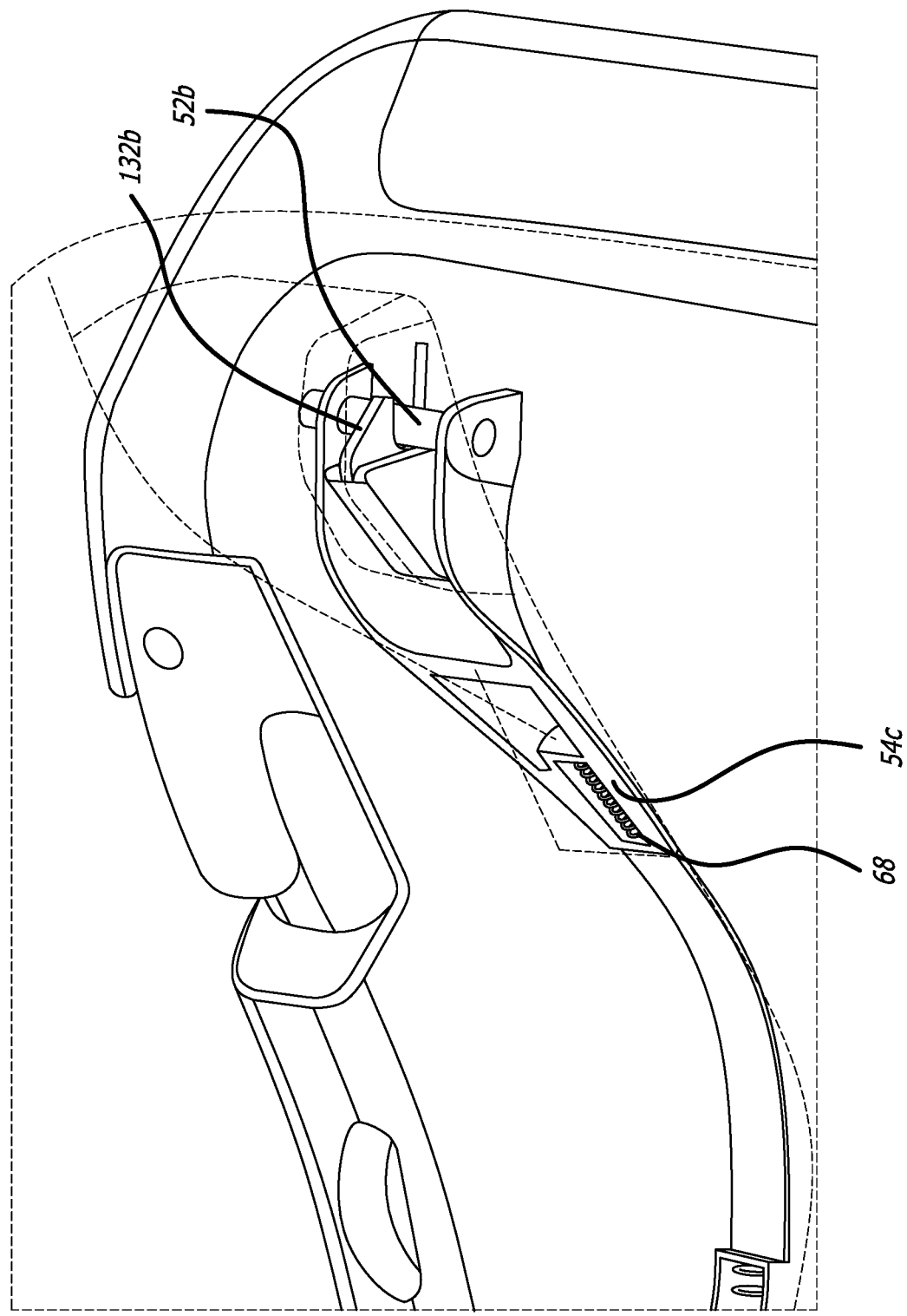

FIG. 14 shows second bracket 132b unhidden and that second locking pin 52b is in a locked position underneath second bracket 132b.

Figure 15:
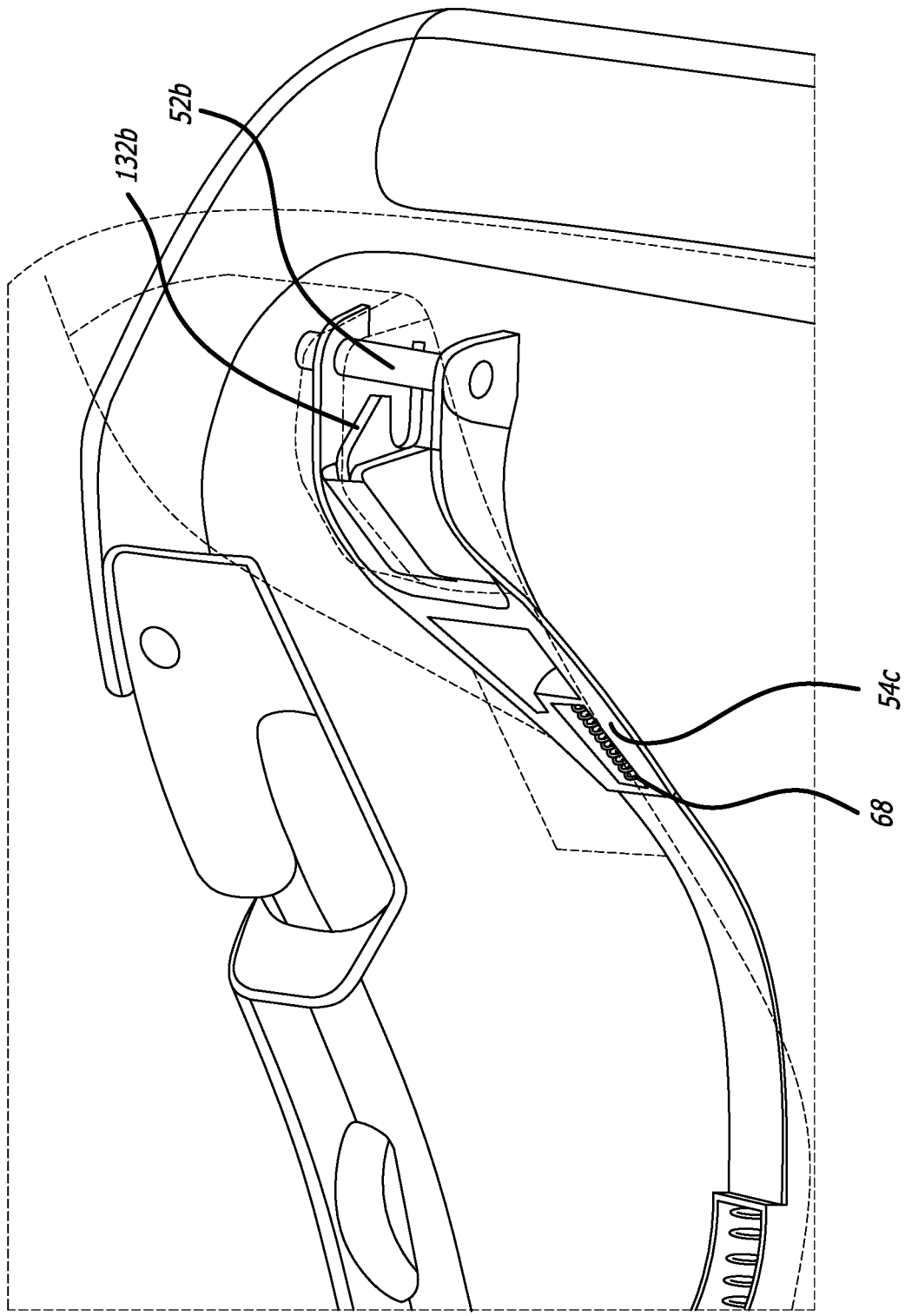
Figure 16:
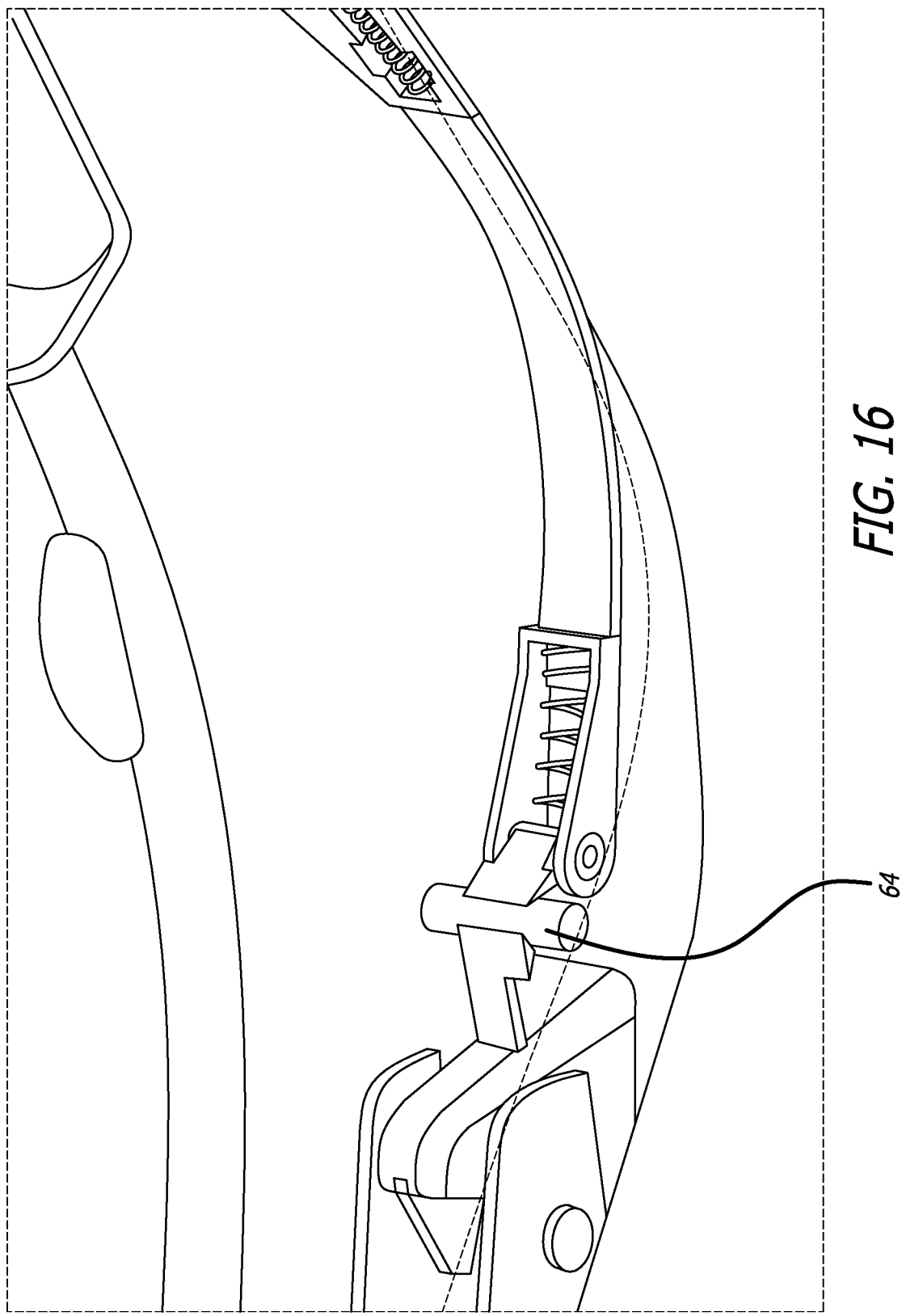
Figure 17:
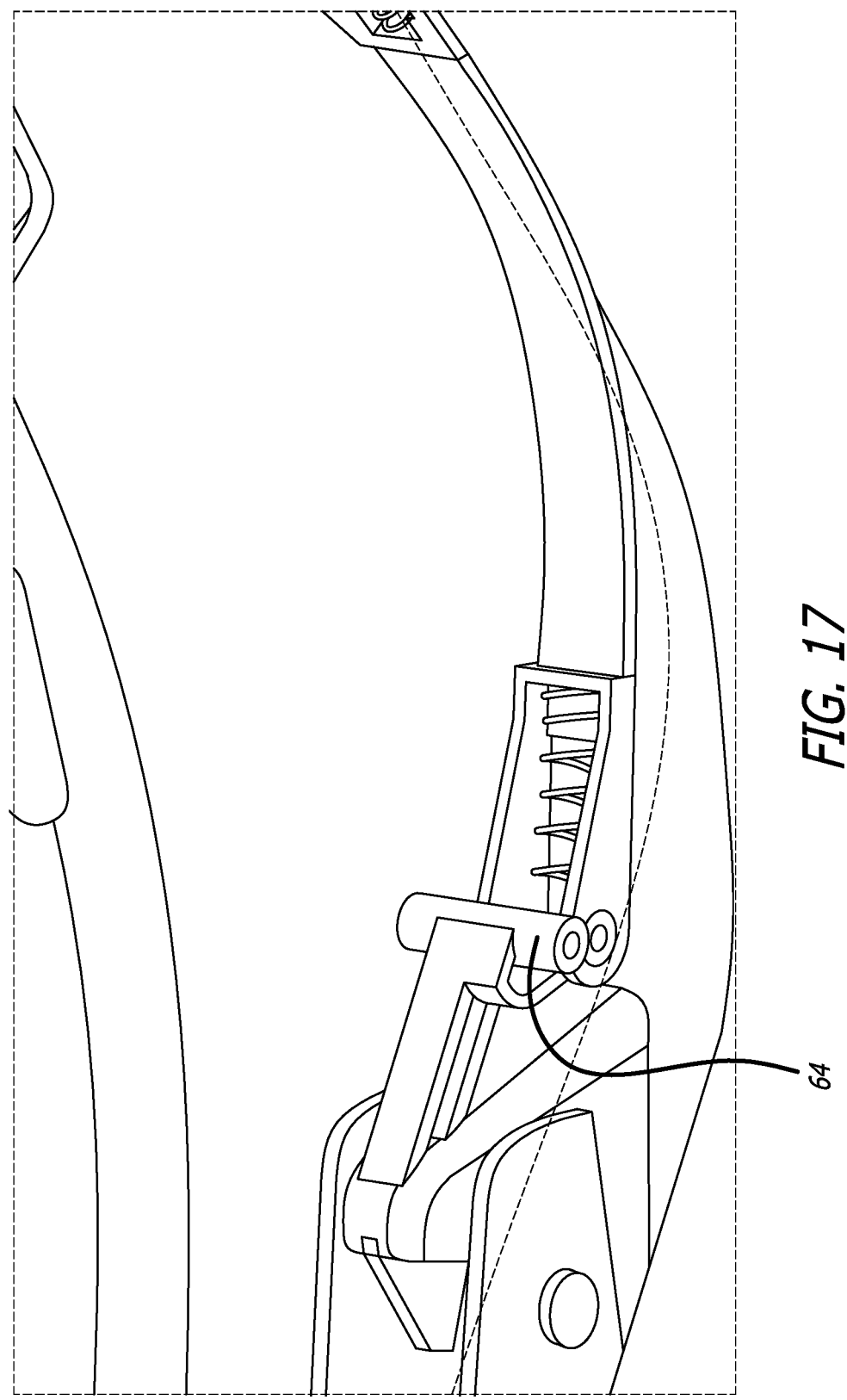
Figure 18:
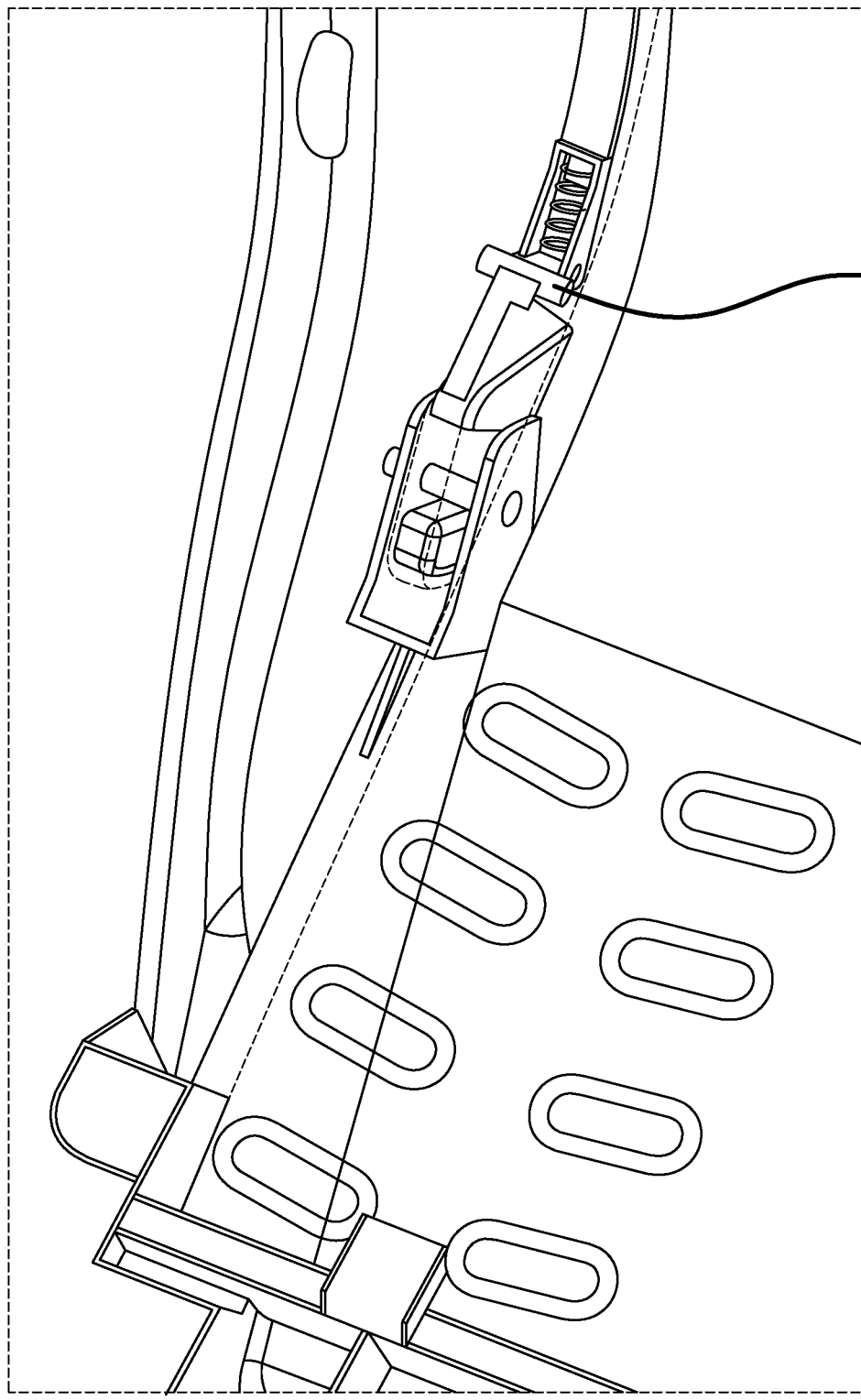
Figure 19:
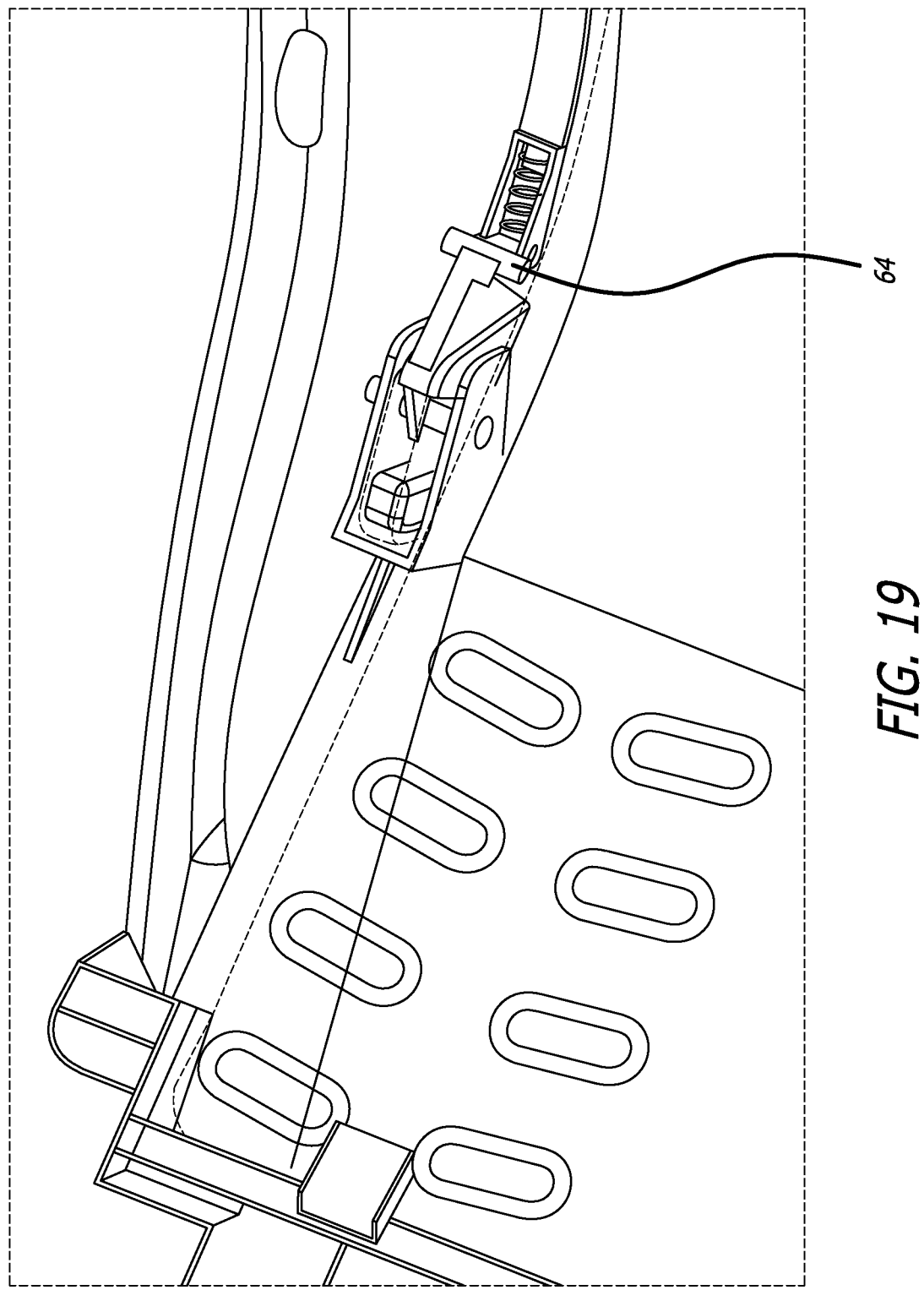

FIG. 15 shows second bracket 132b unhidden and that second locking pin 52b is in an unlocked position out from underneath second bracket 132b.

FIGS. 16 to 19 illustrate that inverting mechanism 64 does not have to be a wheel and can instead be a rotatable lever.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

The invention is claimed as follows:

1. An infant car seat system comprising:
   a base including a first pair of brackets and a second pair of brackets;
   an infant car seat including a first pair of locking pins positioned and arranged to be locked via the first pair of brackets and a second pair of locking pins positioned and arranged to be locked via the second pair of brackets, the infant car seat further including a release handle configured to allow the user to unlock the first pair of locking pins from the first pair of brackets, after which the user is able to at least partially lift the infant car seat from the base, the at least partial lifting causing the second pair of locking pins to become unlocked from the second pair of brackets; and
   first members extending from the release handle to first and second release mechanisms, respectively, the first and second release mechanisms holding one each of the first pair of locking pins;
   wherein the base includes first and second projections, the projections holding one each of the first pair of brackets, and wherein the first and second release mechanisms extend around the first and second projections, respectively.

2. The infant car seat system of claim 1, wherein the at least partial lifting causes compression springs to uncoil to unlock the second pair of locking pins from the second pair of brackets.

3. The infant car seat system of claim 1, wherein the release handle is rotatably connected to the infant car seat.

4. The infant car seat system of claim 1, wherein the release handle is spring biased to be in a closed or unactuated position.

5. The infant car seat system of claim 1, wherein the first members extend from a bridge member formed with or attached to the release handle.

6. The infant car seat system of claim 1, wherein the first and second projections are generally U-shaped, the first and second release mechanisms extend around the U-shapes of the first and second projections, respectively.

7. The infant car seat system of claim 1, wherein the first and second release mechanisms are generally four-sided structures open on top and bottom so as to be able to extend around the first and second projections, respectively.

8. The infant car seat system of claim 1, which includes second members extending from the first and second release mechanisms to one each of the second pair of locking pins.

9. The infant car seat system of claim 8, wherein each of the second members is formed with or attached to a connector that holds one each of the second pair of locking pins.

10. The infant car seat system of claim 8, wherein each of the second members is formed with or attached to a connector that includes a ramped surface that engages a ramped outer surface of one of the first and second projections.

11. The infant car seat system of claim 10, which includes first and second compression springs compressed between the connectors and the first and second release mechanisms, respectively, wherein the compression springs remain compressed until the user is able to at least partially lift the infant car seat from the base.

12. The infant car seat system of claim 11, wherein the compression springs expanding due to the user at least partially lifting the infant car seat from the base cause the second members to pull one each of the second pair of locking pins from the second pair of brackets.

13. The infant car seat system of claim 12, wherein the compression springs expanding due to the user at least partially lifting the infant car seat from the base is enabled by the user actuating the release handle to unlock the first pair of locking pins from the first pair of brackets.

14. The infant car seat system of claim 10, wherein the ramped surfaces of the second members are able to slide against the ramped outer surfaces of the first and second projections when the user actuates the release handle to unlock the first pair of locking pins from the first pair of brackets.

15. The infant car seat system of claim 8, wherein each of the second pair of locking pins is held by a connector, each second member extending to one of the connectors, and wherein a compression spring is located within each connector, the compression spring biased to push against the connector and an end of the respective second member.

16. The infant car seat system of claim 1, wherein the base includes first and second infant foot end projections, the infant foot end projections holding one each of the second pair of brackets.

17. The infant car seat system of claim 1, wherein the release handle is further configured to allow the user to unlock a pair of latches from a corresponding pair of external carrier catches when the car seat is attached to a stroller instead of the base.

18. The infant car seat system of claim 17, wherein the pair of latches are biased into an external carrier locking position by a pair of compression springs, and wherein pulling the release handle compresses the compression springs.

* * * * *